United States Patent
Yabu et al.

(10) Patent No.: US 7,614,246 B2
(45) Date of Patent: Nov. 10, 2009

(54) AIR CONDITIONING APPARATUS

(75) Inventors: Tomohiro Yabu, Sakai (JP); Hiromune Matsuoka, Sakai (JP); Jun Koizumi, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 44 days.

(21) Appl. No.: 12/094,252

(22) PCT Filed: Nov. 21, 2006

(86) PCT No.: PCT/JP2006/323142

§ 371 (c)(1),
(2), (4) Date: May 19, 2008

(87) PCT Pub. No.: WO2007/060920

PCT Pub. Date: May 31, 2007

(65) Prior Publication Data

US 2008/0223062 A1   Sep. 18, 2008

(30) Foreign Application Priority Data

Nov. 25, 2005   (JP) .............................. 2005-340934

(51) Int. Cl.
*F25D 23/12* (2006.01)
(52) U.S. Cl. ........................................ 62/259.1; 62/419
(58) Field of Classification Search ................ 62/259.1, 62/416, 426
See application file for complete search history.

(56) References Cited

FOREIGN PATENT DOCUMENTS

| JP | 04-261626 A | 9/1992 |
| JP | 11-226331 A | 8/1999 |
| JP | 2004-156794 A | 6/2004 |
| JP | 2005-308274 A | 11/2005 |

*Primary Examiner*—Melvin Jones
(74) *Attorney, Agent, or Firm*—Global IP Counselors

(57) ABSTRACT

An air conditioning apparatus is capable of being mounted on the ceiling of an air-conditioned room. The air conditioning apparatus includes a casing in which an intake port is formed in a bottom surface, a filter provided in the intake port, a cleaning mechanism for removing dust collected by the filter from the filter, and a dust box provided at the bottom of the casing to collect dust removed by the cleaning mechanism. A nozzle insertion hole through which a nozzle of a vacuum cleaner can be inserted is formed facing downward in the dust box.

15 Claims, 19 Drawing Sheets

AIR CONDITIONING APPARATUS

CROSS-REFERENCE TO RELATED APPLICATIONS

This U.S. National stage application claims priority under 35 U.S.C. §119(a) to Japanese Patent Application No. 2005-340934, filed in Japan on Nov. 25, 2005, the entire contents of which are hereby incorporated herein by reference.

TECHNICAL FIELD

The present invention relates to an air conditioning apparatus, and particularly to a ceiling-mounted air conditioning apparatus that can be mounted on the ceiling of an air conditioned room.

BACKGROUND ART

Conventional ceiling-mounted air conditioning apparatuses include those that comprise, e.g., a casing in which are formed an intake port for drawing in indoor air on the bottom surface and a discharge port for blowing out the indoor air, and a ventilation fan and heat exchanger disposed inside the casing. In this type of ceiling-mounted air conditioning apparatus, a filter is provided to the intake port. This filter collects dust from the indoor air so that the dust does not flow into the casing.

DISCLOSURE OF THE INVENTION

However, when the air conditioning apparatus is operated for a long period of time, dust accumulates in the filter and pressure loss increases in the intake port, which is a cause of reduced performance. The dust collected in the filter therefore needs to be removed. Cleaning the filter is an extremely laborious operation because the filter must be removed from the intake port in the bottom surface of the casing, which is mounted in a highly elevated location.

An object of the present invention is to reduce the labor needed to clean the filter provided to the intake port in the bottom surface of the casing in a ceiling-mounted air conditioning apparatus.

The air conditioning apparatus according to a first aspect is an air conditioning apparatus capable of being mounted on the ceiling of an air-conditioned room, and comprises a casing in which an intake port is formed in the bottom surface, a filter provided in the intake port, a cleaning mechanism for removing dust collected by the filter from the filter, and a dust box provided at the bottom of the casing to collect the dust removed by the cleaning mechanism. A nozzle insertion hole through which a nozzle of a vacuum cleaner can be inserted is formed facing downward in the dust box.

In this air conditioning apparatus, since a cleaning mechanism is provided, dust can be removed from the filter provided to the intake port in the bottom surface of the casing without taking out the filter, and the removed dust can be collected in the dust box provided at the bottom of the casing. Moreover, since a nozzle insertion hole through which the nozzle of a vacuum cleaner can be inserted is formed facing downward in the dust box, a high-place work can be avoided, and the dust collected in the dust box can be drawn from the dust box interior into the vacuum cleaner and discharged by the simple operation of inserting the nozzle of the vacuum cleaner into the nozzle insertion hole from underneath the air conditioning apparatus. Using this ceiling-mounted air conditioning apparatus, it is thereby possible to reduce the labor needed to clean the filter provided in the intake port in the bottom surface of the casing.

The air conditioning apparatus according to a second aspect is the air conditioning apparatus according to the first aspect, wherein the nozzle insertion hole is provided with an opening/closing lid that is opened by the insertion of the nozzle of the vacuum cleaner.

In this air conditioning apparatus, since the nozzle insertion hole is provided with an opening/closing lid that is opened by the insertion of the nozzle of the vacuum cleaner, the dust collected in the dust box by the cleaning mechanism can be prevented from dropping out through the nozzle insertion hole until the operation in which the vacuum cleaner suctions out the dust collected in the dust box, and the high-place work for opening the opening/closing lid can be avoided.

The air conditioning apparatus according to a third aspect is the air conditioning apparatus according to the second aspect, wherein the opening/closing lid is closed by the withdrawal of the nozzle of the vacuum cleaner from the nozzle insertion hole.

In this air conditioning apparatus, since the opening/closing lid is closed by the withdrawal of the nozzle of the vacuum cleaner from the nozzle insertion hole, the high-place work for closing the opening/closing lid can be avoided.

The air conditioning apparatus according to a fourth aspect is the air conditioning apparatus according to the second or third aspect, wherein the opening/closing lid opens upward.

In this air conditioning apparatus, since the opening/closing lid opens upward, the dust collected in the dust box can be prevented from dropping out when the opening/closing lid opens.

The air conditioning apparatus according to a fifth aspect is the air conditioning apparatus according to any one aspect of the second through fourth aspects, wherein the opening/closing lid is closed due to gravity.

In this air conditioning apparatus, since the opening/closing lid closes due to gravity, the opening/closing lid can be closed by withdrawing the nozzle of the vacuum cleaner from the nozzle insertion hole.

The air conditioning apparatus according to a sixth aspect is the air conditioning apparatus according to any one aspect of the second through fifth aspects, wherein two opening/closing lids are provided in alignment with the direction in which the nozzle of the vacuum cleaner is inserted.

In this air conditioning apparatus, since two opening/closing lids are provided in alignment with the direction in which the nozzle of the vacuum cleaner is inserted, it is possible to further improve the effects in which the dust collected in the dust box by the cleaning mechanism is prevented from dropping out through the nozzle insertion hole.

The air conditioning apparatus according to a seventh aspect is the air conditioning apparatus according to any one aspect of the first through sixth aspects, wherein the dust box is provided with a valve composed of a material that can be elastically deformed by the suction force of the vacuum cleaner.

In this air conditioning apparatus, since the dust box is provided with a valve composed of a material that can be elastically deformed by the suction force of the vacuum cleaner, the dust collected in the dust box by the cleaning mechanism can be prevented from dropping out of the insertion hole, and the operation of drawing the dust collected in the dust box into the vacuum cleaner and discharging the dust out of the dust box can be easily performed.

The air conditioning apparatus according to an eighth aspect is the air conditioning apparatus according to any one aspect of the first through seventh aspects, wherein the dust box has a first wall that faces the nozzle insertion hole, a second wall that faces the first wall, and a third wall that is in contact with the first wall. A plurality of air holes is formed in the second wall.

In this air conditioning apparatus, when the nozzle of the vacuum cleaner is inserted into the nozzle insertion hole and the dust is drawn into the vacuum cleaner and discharged out of the dust box, since air from outside of the dust box can get in through the air holes, it is possible to prevent making it difficult for the dust to be drawn into the vacuum cleaner by extreme decreases in the pressure in the dust box.

The air conditioning apparatus according to a ninth aspect is the air conditioning apparatus according to any one aspect of the first through seventh aspects, wherein the dust box has a first wall that faces the nozzle insertion hole, a second wall that faces the first wall, and a third wall that is in contact with the first wall. A plurality of air holes is formed in the third wall.

In this air conditioning apparatus, when the nozzle of the vacuum cleaner is inserted into the nozzle insertion hole and the dust is drawn into the vacuum cleaner and discharged out of the dust box, since air from outside of the dust box can get in through the air holes, it is possible to prevent making it difficult for the dust to be drawn into the vacuum cleaner by extreme decreases in the pressure in the dust box.

The air conditioning apparatus according to a tenth aspect is the air conditioning apparatus according to the ninth aspect, wherein the air holes are formed from a middle position between the first wall and the second wall up to a position in the side of the second wall.

In this air conditioning apparatus, since the air holes are formed from a middle position between the first wall and the second wall up to a position in the side of the second wall, when the nozzle of the vacuum cleaner is inserted into the nozzle insertion hole and the dust is drawn into the vacuum cleaner and discharged out of the dust box, it is not likely that air coming in from the outside of the dust box will be impeded by the dust collected in the dust box.

The air conditioning apparatus according to an eleventh aspect is the air conditioning apparatus according to any one aspect of the eighth through tenth aspects, wherein a ventilation fan for drawing air into the casing through the intake port is accommodated within the casing, and an intake flow channel for air running from the intake port to the ventilation fan is formed in the casing. The air holes communicate with the intake flow channel.

In this air conditioning apparatus, since the air holes communicate with the intake flow channel, negative pressure can be created in the dust box by the operation of the ventilation fan, whereby the dust in the dust box can be compressed and collected inside the dust box in a compact manner.

The air conditioning apparatus according to a twelfth aspect is the air conditioning apparatus according to any one aspect of the first through seventh aspects, wherein a ventilation fan for drawing air into the casing through the intake port is accommodated within the casing, and an intake flow channel for air running from the intake port to the ventilation fan is formed in the casing. The casing is provided with a communicating part that is connected to the dust box and that has a plurality of air holes formed at a position facing the intake flow channel.

In this air conditioning apparatus, a communicating part having a plurality of air holes formed at a position facing the intake flow channel is provided so as to allow the intake flow channel to communicate with the dust box, allowing air from outside of the dust box to get in through the air holes when the nozzle of the vacuum cleaner is inserted into the nozzle insertion hole and dust is drawn into the vacuum cleaner and discharged out of the dust box. Therefore, it is possible to prevent making it difficult for the dust to be drawn into the vacuum cleaner by extreme decreases in the pressure in the dust box. Moreover, since these air holes communicate with the intake flow channel, negative pressure can be created in the dust box by the operation of the ventilation fan, whereby the dust in the dust box can be compressed and collected inside the dust box in a compact manner.

The air conditioning apparatus according to a thirteenth aspect is the air conditioning apparatus according to the eleventh or twelfth aspect, wherein an intake grill is provided on the underside of the filter. The air holes communicate with the portion of the intake flow channel that lies between the filter and the intake grill.

In this air conditioning apparatus, since the air holes communicate with a position in the intake flow channel upstream of the filter, if dust collected in the dust box scatters outside of the dust box through the air holes, the dust is again collected by the filter and does not get drawn into the casing.

The air conditioning apparatus according to a fourteenth aspect is the air conditioning apparatus according to any one aspect of the eighth through thirteenth aspects, wherein the air holes are substantially circular and have a diameter of 5 mm or less.

In this air conditioning apparatus, since the air holes are substantially circular and have a diameter of 5 mm or less, when the nozzle of the vacuum cleaner is inserted into the nozzle insertion hole and dust is drawn into the vacuum cleaner and discharged out of the dust box, a sufficient amount of air can get in from outside the dust box through the air holes, and the dust collected in the dust box can be prevented as much as possible from scattering to the outside of the dust box through the air holes.

DETAILED DESCRIPTION OF THE PREFERRED EMBODIMENTS INVENTION

The following is a description, made with reference to the drawings, of the embodiments of the ceiling-mounted air conditioning apparatus according to the present invention.

Figure 1:
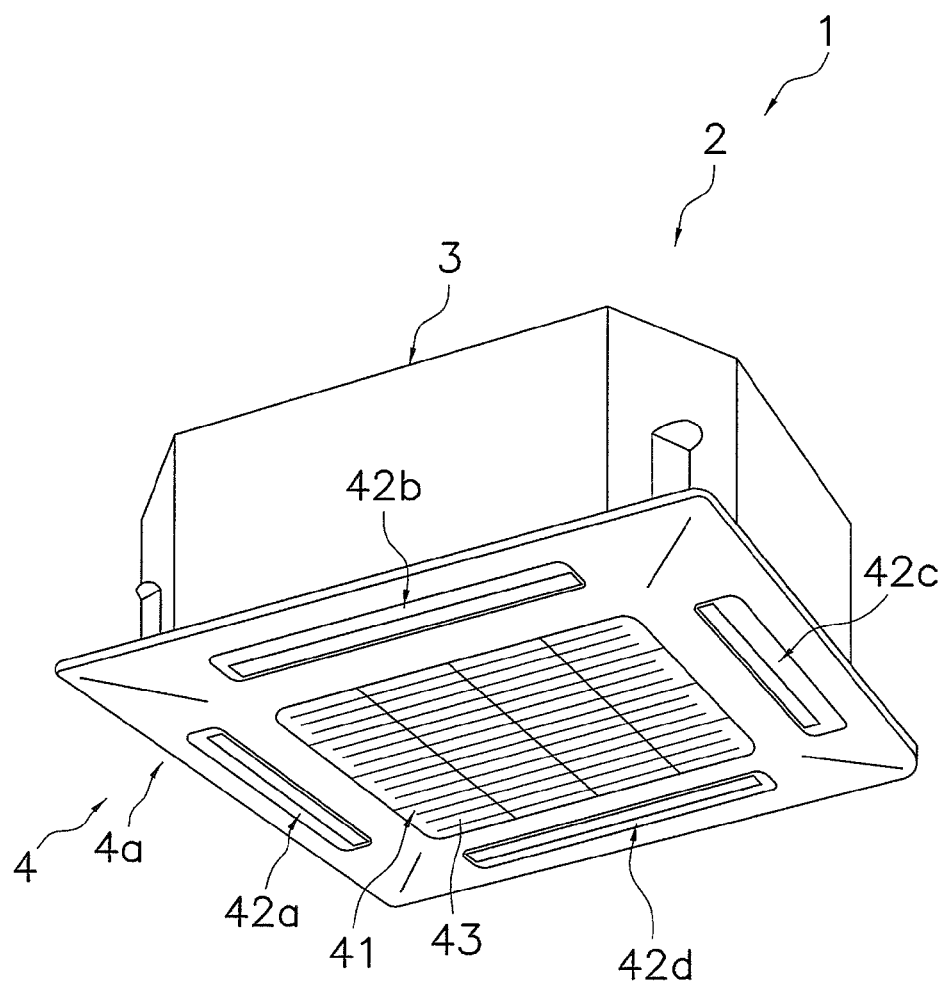
FIG. 1 is an external perspective view of a ceiling-mounted air conditioning apparatus (ceiling not shown) according to an embodiment of the present invention.
Figure 2:
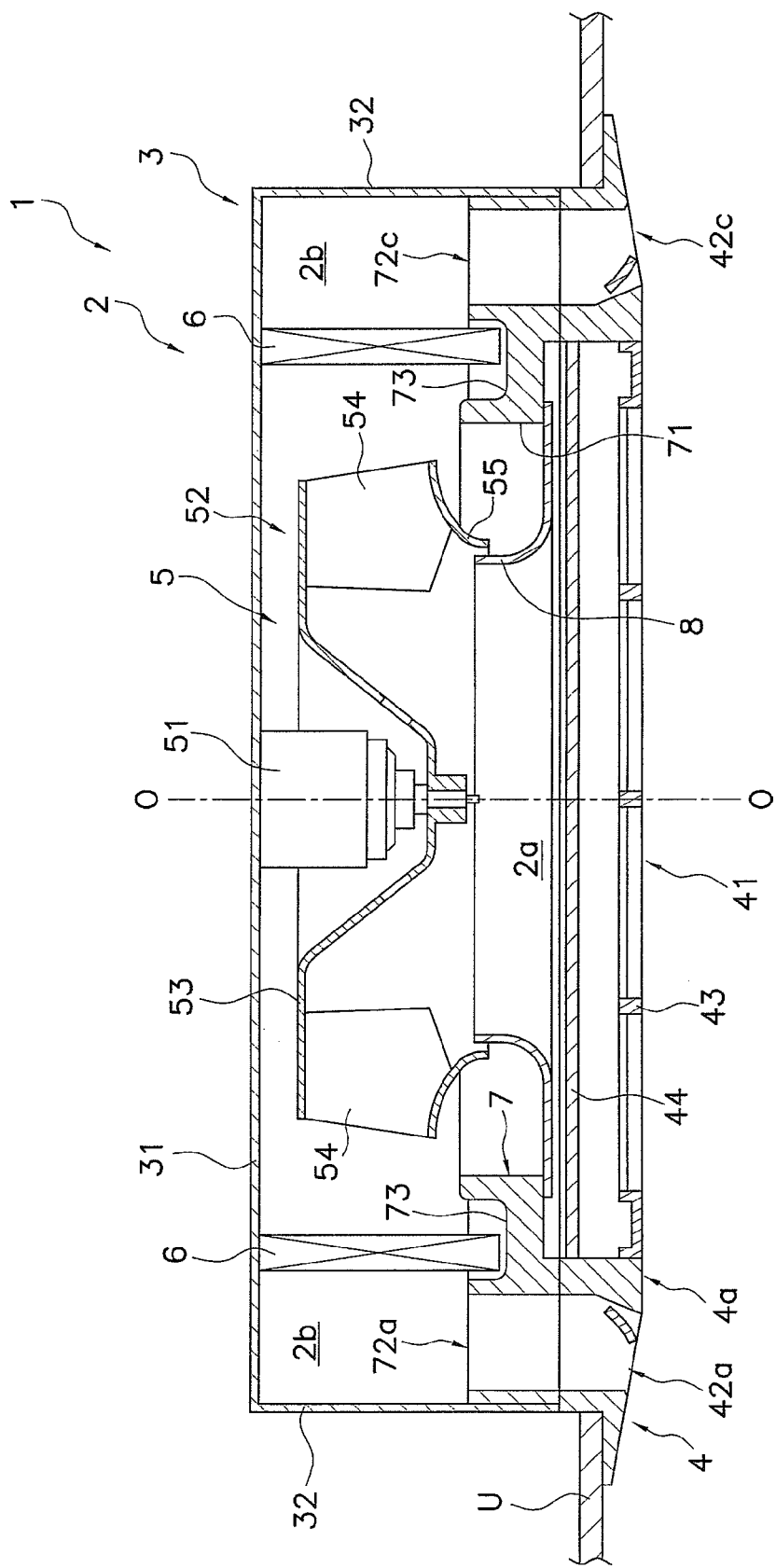
FIG. 2 is a schematic cross-sectional side view of the air conditioning apparatus.

(1) Essential Configuration of the Ceiling-mounted Air Conditioning Apparatus FIG. 1 shows an external perspective view of a ceiling-mounted air conditioning apparatus 1 (ceiling not shown) according to an embodiment of the present invention. The air conditioning apparatus 1 is a ceiling-embedded air conditioning apparatus, comprising a casing 2 for housing various structural devices in the interior. The casing 2 is configured primarily from a casing main body 3 and a face panel 4 disposed on the underside of the casing main body 3. The casing main body 3 is inserted and disposed into an opening formed in the ceiling U of an air-conditioned room, as shown in FIG. 2, for example. In this case, the face panel 4 is disposed so as to be fitted into the opening of the ceiling U. FIG. 2 is a schematic cross-sectional side view of the air conditioning apparatus 1. The letters O in the drawing indicate the rotational axis or rotational center of a ventilation fan 5.

In a plan view, the casing main body 3 has a box shape that is open in the substantially octagonal bottom surface, in which longer sides and shorter sides are formed alternately. The casing main body 3 has a substantially octagonal top panel 31 in which longer sides and shorter sides are formed alternately and continuously, and side panels 32 extending downward from the peripheral edges of the top panel 31.

The face panel 4 has a plate shape that is substantially rectangular in a plan view, and is configured primarily from a panel main body 4a fixed at the bottom end of the casing main body 3. On the panel main body 4a are formed an intake port 41 for drawing indoor air into the substantial center, and a plurality (four in the present embodiment) of discharge ports 42a, 42b, 42c, 42d that are formed encircling the intake port 41 and that blow air out from the casing main body 3 into the air-conditioned room. The intake port 41 is a substantially rectangular or substantially circular opening in the present embodiment. The discharge ports 42a, 42b, 42c, 42d are substantially rectangular openings that extend long and thinly along the peripheral edges of the panel main body 4a. The bottom surface of the panel main body 4a is provided with a substantially rectangular intake grill 43 disposed so as to cover the intake port 41 and to be encircled by the discharge ports 42a, 42b, 42c, 42d. Furthermore, the topside of the intake grill 43 of the intake port 41 is provided with a filter 44 for collecting dust in the air drawn in through the intake port 41.

Disposed inside the casing main body 3 are primarily the ventilation fan 5, which draws indoor air into the casing main body 3 through the intake port 41 of the face panel 4 and blows the air out in the circumferential direction, and a heat exchanger 6 disposed so as to encircle the external periphery of the ventilation fan 5.

In the present embodiment, the ventilation fan 5 is a turbofan having a fan motor 51 provided substantially in the center of the top panel 31 of the casing main body 3, and an impeller 52 that is linked to and rotatably driven by the fan motor 51. The impeller 52 has a circular plate-shaped end plate 53 linked to the fan motor 51, a plurality of blades 54 provided on the external periphery of the bottom surface of the end plate 53, and a circular plate-shaped end ring 55 that is provided on the underside of the blades 54 and that has an opening in the center. The rotation of the blades 54 allows the ventilation fan 5 to draw air into the impeller 52 through the opening in the end ring 55, and to blow the air drawn into the impeller 52 out to the external periphery of the impeller 52.

In the present embodiment, the heat exchanger 6 is a cross-fin tube heat exchanger panel formed by bending so as to encircle the external periphery of the ventilation fan 5, and is connected via a refrigerant tube to an outdoor unit (not shown) installed out of doors or in another location. The heat exchanger 6 is designed to be capable of functioning as an evaporator of the refrigerant flowing through the interior during the cooling operation, and as a condenser of the refrigerant flowing through the interior during the heating operation. The heat exchanger 6 thereby exchanges heat with the air drawn into the casing main body 3 through the intake port 41 by the ventilation fan 5, and the heat exchanger 6 is capable of cooling the air during the cooling operation and heating the air during the heating operation.

A drain pan 7 is disposed on the underside of the heat exchanger 6, for receiving drain water created from moisture in the air being condensed in the heat exchanger 6. The drain pan 7 is mounted on the bottom of the casing main body 3. The drain pan 7 has an intake hole 71 formed so as to communicate with the intake port 41 of the face panel 4, four discharge ports 72a, 72b, 72c, 72d formed so as to communicate with the discharge ports 42a, 42b, 42c, 42d of the face panel 4, and a drain water-receiving groove 73 formed on the underside of the heat exchanger 6 to receive drain water. A bell mouth 8 is disposed in the intake hole 71, for guiding the air drawn into the intake port 41 to the impeller 52 of the ventilation fan 5.

On the casing 2 are formed an intake flow channel 2a that runs from the intake port 41 of the face panel 4 to the ventilation fan 5 through the intake grill 43, the filter 44, and the bell mouth 8; and a discharge flow channel 2b that runs from the ventilation fan 5 to the discharge port of the face panel 4 through the heat exchanger 6 and the discharge ports 72a through 72d.

(2) Air Conditioning Operation of Air Conditioning Apparatus

Next, the air conditioning operation of the air conditioning apparatus 1 will be described using FIGS. 1 and 2.

When the operation begins, the fan motor 51 is driven, and the impeller 52 of the ventilation fan 5 rotates. Refrigerant is supplied from the outdoor unit (not shown) to the inside of the heat exchanger 6, together with the driving of the fan motor 51. The heat exchanger 6 herein operates as an evaporator during the cooling operation and as a condenser during the heating operation. As the impeller 52 rotates, the air in the air-conditioned room is drawn into the casing main body 3 through the intake port 41 of the face panel 4 via the intake flow channel 2a. This drawn-in air is blown out to the external periphery by the impeller 52 where the air reaches the heat exchanger 6, and the air is either cooled or heated in the heat exchanger 6. The air is then blown out into the air-conditioned room through the discharge ports 42a through 42d of the face panel 4 via the discharge flow channel 2b. Thus, the air-conditioned room is either cooled or heated.

When this type of air conditioning operation is performed for a long period of time, dust accumulates in the filter 44 and pressure loss in the intake port 41 increases, causing reduced performance and other such problems. Therefore, the dust collected in the filter 44 must be removed, but the air conditioning apparatus 1 of the present embodiment is designed so that the dust can be removed from the filter 44 without taking the filter 44 off of the face panel 4, which is the bottom of the casing 2. The following is a description of the structure and cleaning operation for removing dust collected by the filter 44 of the air conditioning apparatus 1 of the present embodiment.

(3) Configuration of Filter, Cleaning Mechanism, and Dust Box

Figure 3:
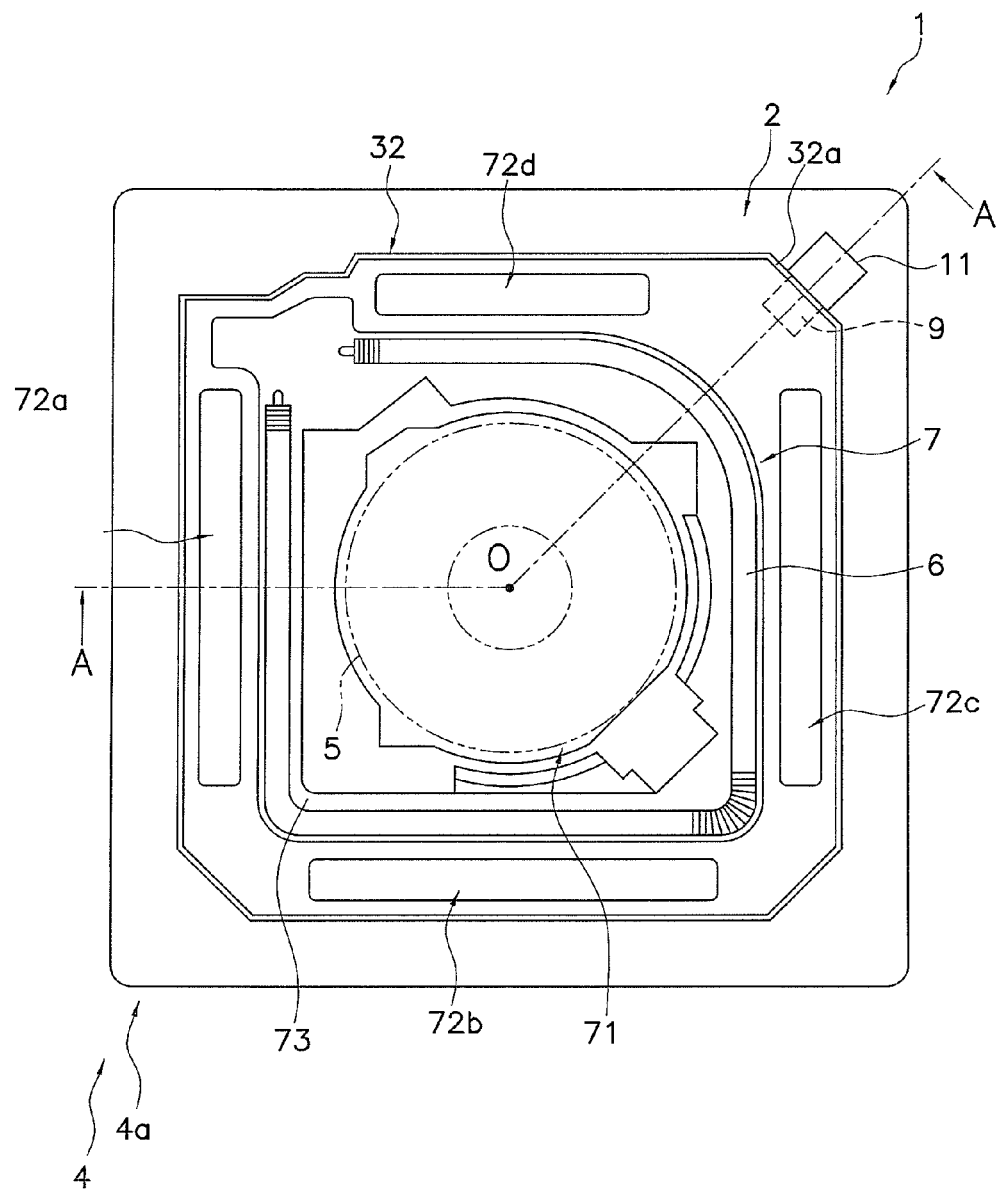
FIG. 3 is a schematic cross-sectional plan view of the air conditioning apparatus, depicting the top panel as being removed.
Figure 4:
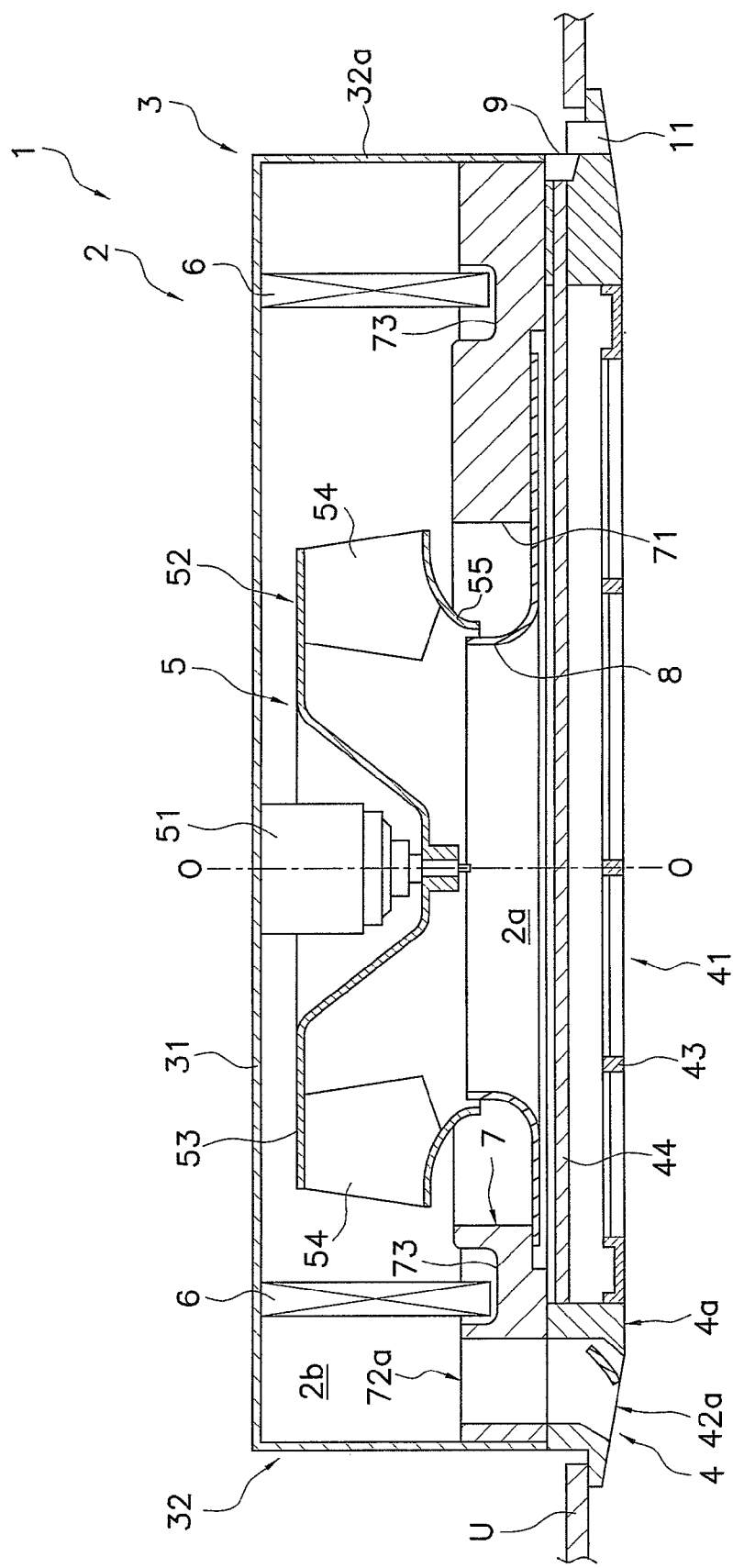
FIG. 4 is a schematic cross-sectional side view of the air conditioning apparatus, and is a cross-sectional view along the line A-O-A in FIG. 3.
Figure 5:
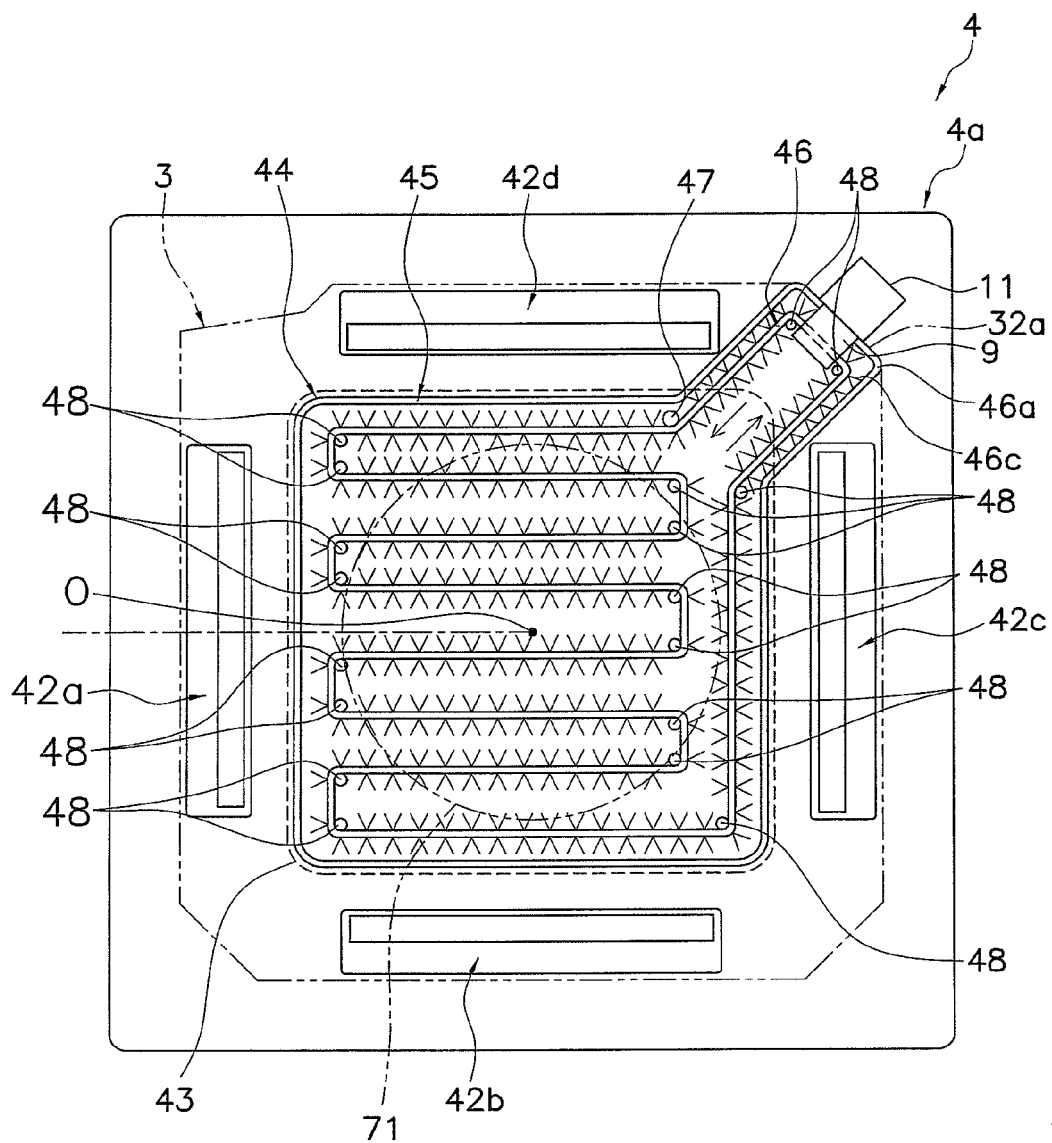
FIG. 5 is a schematic cross-sectional plan view of a face panel.
Figure 6:
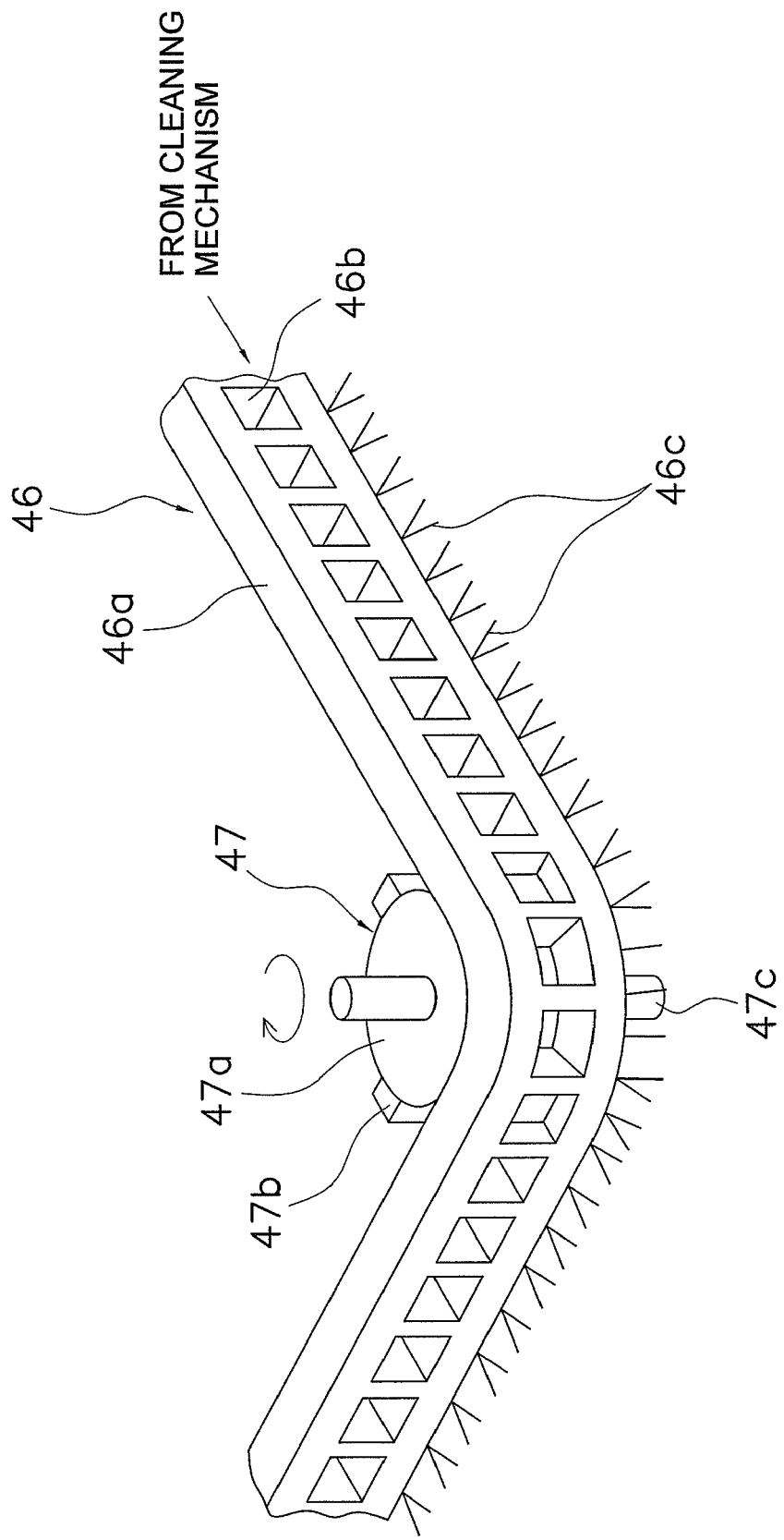
FIG. 6 is a perspective view showing the structure in the vicinity of a sprocket of a filter.
Figure 7:
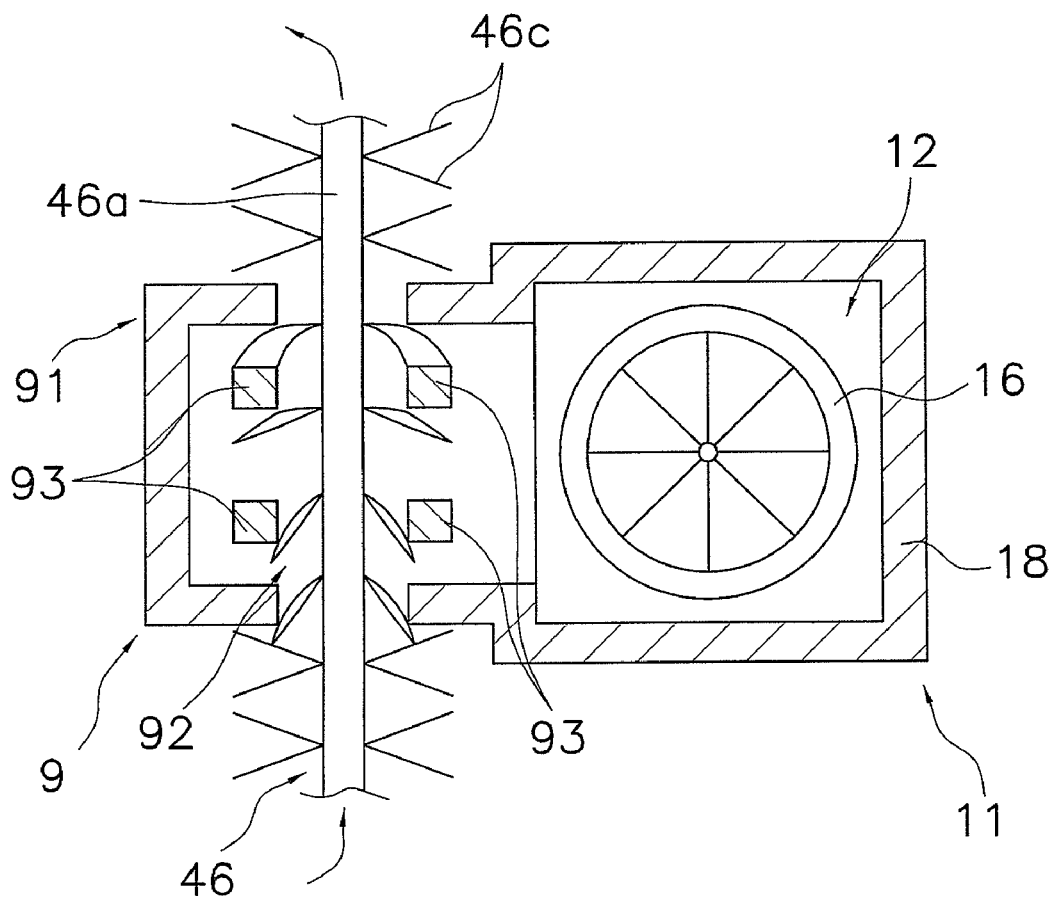
FIG. 7 is a schematic cross-sectional plan view of a cleaning mechanism and a dust box.
Figure 8:
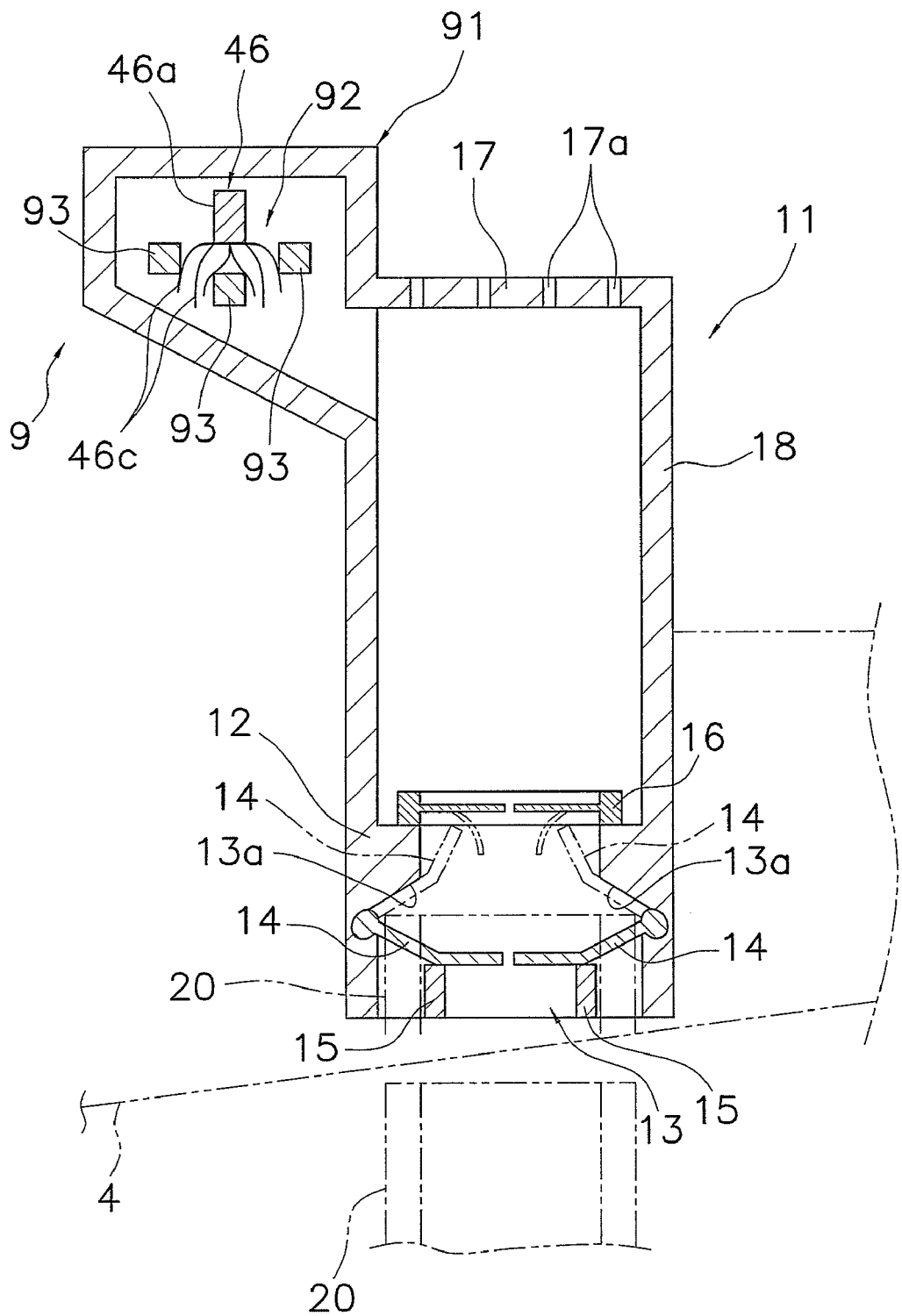
FIG. 8 is a schematic cross-sectional side view of the cleaning mechanism and the dust box.

In the air conditioning apparatus 1 having the essential configuration such as is described above, the filter 44 has a frame member 45 and a filtration member 46 held on the frame member 45 in a meandering pattern, as shown in FIGS. 3 through 8. A cleaning mechanism 9 is provided for removing the dust collected by the filter 44 (specifically, the filtration member 46) during the above-described air conditioning operation from the filter 44, and a dust box 11 is provided for collecting the dust removed by the cleaning mechanism 9. FIG. 3 is a schematic cross-sectional plan view of the air conditioning apparatus 1, depicting the top panel 31 as being removed. FIG. 4 is a schematic cross-sectional side view of the air conditioning apparatus 1, and is a cross-sectional view along the line A-O-A in FIG. 3. FIG. 5 is a schematic cross-sectional plan view of the face panel 4. FIG. 6 is a perspective view showing the structure in the vicinity of a sprocket 47 of the filter 44. FIG. 7 is a schematic cross-sectional plan view of the cleaning mechanism 9 and the dust box 11. FIG. 8 is a schematic cross-sectional side view of the cleaning mechanism 9 and the dust box 11.

The filtration member 46 constituting the filter 44 has a belt-shaped core 46a that has a substantially rectangular cross section. The core 46a is a member formed from a flexible material so as to bend freely. A large number of engaging holes 46b are formed at constant intervals on the core 46a, for engaging with teeth 47b of the sprocket 47 that rotatably supports the filtration member 46. Needle-shaped capillary members 46c are grafted into the portion of the core 46a that is upstream of the intake flow channel 2a (specifically, the bottom of the core 46a).

The frame member 45 constituting the filter 44 is a substantially rectangular member disposed so as to face the top side of the intake grill 43 in a plan view, and only a portion corresponding to one of the four corners (in proximity to the side panel 32a in the top right of FIG. 5) protrudes out to the external periphery of the casing main body 3 through the space between discharge ports (specifically, between the discharge port 42c and the discharge port 42d) of the face panel 4. A sprocket 47 is disposed on this frame member 45 in order to arrange the filtration member 46 in a meandering state and to cyclically move the filtration member 46, and roller-shaped supporting members 48 are provided at the other bending parts of the filtration member 46 to be in contact with the surface of the core 46a and to support the core 46a.

The sprocket 47 has teeth 47b formed on the periphery of a cylindrical main body 47a in order to engage with the engaging holes 46b. A rotating shaft 47c is provided in the center of the main body 47a. The rotating shaft 47c is rotatably driven in the direction of the arrow by a motor (not shown), whereby the teeth 47b of the sprocket 47 engage with the engaging holes 46b, and the filtration member 46 can be cyclically moved in the direction of the arrow while being held in a meandering state.

The cleaning mechanism 9 is disposed at the corner where part of the frame member 45 protrudes out to the external periphery of the casing main body 3, and is primarily composed of a main body 91 for brushing off the dust collected on the capillary members 46c of the filtration member 46. The main body 91 is provided with a passage 92 through which the filtration member 46 passes, and contact parts 93 are disposed at a plurality of locations inside the passage 92. These contact parts 93 form a narrow passage that allows the filtration member 46 to pass through, and the capillary members 46c are moved while being pushed against the corners of the walls that form this passage, whereby the dust collected on the capillary members 46c can be brushed off. The dust box 11 is detachably connected to the main body 91 of the cleaning mechanism 9.

The dust box 11 is a container that is connected to the main body 91 of the cleaning mechanism 9, and that collects the dust brushed off by the contact parts 93. In the present embodiment, the dust box 11 is disposed on the outside of the casing main body 3. More specifically, the dust box 11 is outside of the cleaning mechanism 9, and is disposed along the external surface of the side panel 32a of the casing 3 in a plan view.

In the present embodiment, the dust box 11 is a substantially cylindrical container, an a nozzle insertion hole 13 that allows a nozzle 20 of a vacuum cleaner to be inserted is formed facing downward in a first wall 12 that constitutes the bottom surface of the dust box 11. This nozzle insertion hole 13 is provided with an opening/closing lid 14 that is opened by inserting the nozzle 20 of the vacuum cleaner, and that is closed by withdrawing the nozzle 20 of the vacuum cleaner. This opening/closing lid 14 is made of a pair of plate-shaped members that are axially supported on the first wall 12 of the dust box 11 so as to be capable of opening and closing vertically. Inserting the nozzle 20 of the vacuum cleaner into the nozzle insertion hole 13 from below causes the opening/closing lid 14 to be pushed upward and opened by the distal end of the nozzle 20 of the vacuum cleaner, and withdrawing the nozzle 20 of the vacuum cleaner downward from the nozzle insertion hole 13 to the inclined surface 13a of the nozzle insertion hole 13 causes the upward force of the distal end of the nozzle 20 of the vacuum cleaner to be released. The opening/closing lid 14 then closes due to gravity and comes into contact with a stopper 15 disposed below the opening/closing lid 14 of the nozzle insertion hole 13. This stopper 15 is formed at the lowest part of the nozzle insertion hole 13 so as to fit into the internal surface of the nozzle of the vacuum cleaner. The dust box 11 is also provided with an inner valve 16 composed of a material that can be elastically deformed by the suction force of the vacuum cleaner. The inner valve 16 is provided above the opening/closing lid 14. A soft gum or rubber can be used as the material for the inner valve 16. A plurality of air holes 17a that communicate with the outside of the casing 2 is formed in a second wall 17, which constitutes the top surface of the dust box 11 and which is disposed so as to face the first wall 12. These air holes 17a are substantially circular and have a diameter of 5 mm or less. Furthermore, the top of a third wall 18, which constitutes the side surface of the dust box 11 and contacts the first wall 12 and second wall 17, communicates with the main body 91 of the cleaning mechanism 9, and is designed to let in the dust that has been brushed off by the contact parts 93 of the cleaning mechanism 9.

(4) Cleaning Operation of Filter

Next, the cleaning operation of the filter 44 of the air conditioning apparatus 1 will be described using FIGS. 4 through 8.

After the air conditioning operation of the air conditioning apparatus 1 has been performed for a specific amount of time, the motor (not shown) of the filter 44 is driven either automatically or by a manual operation, and the sprocket 47 is rotated to cyclically move the filtration member 46. The filtration member 46 thereupon passes through the passage 92 in the cleaning mechanism 9, during which passage the dust collected on the capillary members 46c of the filter 44 are brushed off by the contact parts 93 and are collected in the dust box 11. Specifically, the dust collected by the filter 44 can be removed from the filter 44 by the cleaning mechanism 9, and the dust removed by the cleaning mechanism 9 can be collected in the dust box 11.

Next, when dust has been collected in the dust box 11, the nozzle 20 of the vacuum cleaner is inserted into the nozzle insertion hole 13 from below, whereby the opening/closing lid 14 is pushed upward and opened by the distal end of the nozzle 20 of the vacuum cleaner, and the vacuum cleaner is operated to draw the dust collected in the dust box 11 out of the dust box 11 into the vacuum cleaner. At this time, the inner valve 16 is elastically deformed by the suction force of the vacuum cleaner (see FIG. 8), and the dust collected in the dust box 11 is quickly discharged out of the dust box 11 and drawn into the vacuum cleaner. The air in the dust box 11 is also at this time expelled by the suction force of the vacuum cleaner, and the pressure in the dust box 11 tends to decrease. However, in the air conditioning apparatus 1 of the present embodiment, since the air holes 17a are provided in the second wall 17 of the dust box 11, air gets into the dust box 11 from outside the casing 2 during the suction operation of the vacuum cleaner, and it is possible to prevent making it difficult for the dust to be drawn into the vacuum cleaner by extreme decreases in the pressure in the dust box 11.

Upon completion of the operation of discharging the dust collected in the dust box 11 out from the dust box 11 and drawing the dust into the vacuum cleaner, the operation of the vacuum cleaner is terminated, and the nozzle 20 of the vacuum cleaner is withdrawn from the nozzle insertion hole 13. This results in a state in which the suction force of the vacuum cleaner does not act on the inner valve 16, and the inner valve 16 therefore closes. This also results in a state in which the force of the nozzle 20 of the vacuum cleaner pushing upward on the opening/closing lid 14 is no longer in effect, and the opening/closing lid 14 therefore closes due to gravity.

(5) Characteristics of the Air Conditioning Apparatus of the Present Embodiment

The air conditioning apparatus 1 of the present embodiment, particularly the filter 44, the cleaning mechanism 9, and the dust box 11, have the following characteristics.

(A)

The air conditioning apparatus 1 of the present embodiment has a structure wherein the filter 44 has a frame member 45 and a filtration member 46 that is held on the frame member 45 in a meandering pattern and that can be moved cyclically, and a cleaning mechanism 9 is provided for removing dust from the filtration member 46, the dust having been collected by the filtration member 46 of the filter 44 during the air conditioning operation. Therefore, dust can be removed from the filter 44 provided to the intake port 41 in the bottom surface of the casing 2 (i.e., in the face panel 4) without taking out the filter 44, and the removed dust can be collected in the dust box 11 provided to the bottom of the casing 2 (i.e., to the face panel 4). Moreover, since a nozzle insertion hole 13 that allows a nozzle of a vacuum cleaner to be inserted is formed facing downward in the dust box 11, a high-place work can be avoided, and the dust collected in the dust box 11 can be drawn into the vacuum cleaner and discharged out of the dust box 11 by the simple operation of inserting the nozzle 20 of the vacuum cleaner into the nozzle insertion hole 13 from below the air conditioning apparatus 1. Thereby, with this ceiling-mounted air conditioning apparatus 1, it is possible to reduce the labor needed to clean the filter 44 provided to the intake port 41 in the bottom surface of the casing 2 (i.e., in the face panel 4).

(B)

In the air conditioning apparatus 1 of the present embodiment, since the nozzle insertion hole 13 is provided with an opening/closing lid 14 that is opened by the insertion of the nozzle 20 of the vacuum cleaner, the dust collected in the dust box 11 by the cleaning mechanism 9 can be prevented from dropping out through the nozzle insertion hole 13 until the operation in which the vacuum cleaner suctions out the dust collected in the dust box 11, and a high-place work for opening the opening/closing lid 14 can be avoided.

Moreover, since the opening/closing lid 14 is designed to open upward, the dust collected in the dust box 11 can be prevented from dropping out when the opening/closing lid 14 opens.

The opening/closing lid 14 is also designed to close by the withdrawing of the nozzle 20 of the vacuum cleaner from the nozzle insertion hole 13. The opening/closing lid 14 herein closes due to gravity. Thereby, with the air conditioning apparatus 1 of the present embodiment, a high-place work for closing the opening/closing lid 14 can be avoided.

(C)

In the air conditioning apparatus 1 of the present embodiment, since the dust box 11 is provided with an inner valve 16 composed of a material (for example, a soft gum or rubber) that can be elastically deformed by the suction force of the vacuum cleaner, the dust collected in the dust box 11 by the cleaning mechanism 9 can be prevented from dropping out through the nozzle insertion hole 13, and the operation of drawing the dust collected in the dust box 11 into the vacuum cleaner and discharging the dust out of the dust box 11 can be easily performed.

(D)

In the air conditioning apparatus 1 of the present embodiment, a plurality of air holes 17a is formed in the second wall 17 that faces the first wall 12 which faces the nozzle insertion hole 13. When the nozzle 20 of the vacuum cleaner is inserted into the nozzle insertion hole 13 and the dust is drawn into the vacuum cleaner and discharged out of the dust box 11, air from outside the dust box 11 can get in through the air holes 17a. Therefore, it is possible to prevent making it difficult for the dust to be drawn into the vacuum cleaner by extreme decreases in the pressure in the dust box 11.

Moreover, since these air holes 17a are substantially circular and have a diameter of 5 mm or less, when the nozzle of the vacuum cleaner is inserted into the nozzle insertion hole 13 and the dust is drawn into the vacuum cleaner and discharged out of the dust box 11, air from outside the dust box 11 can sufficiently get in through the air holes 17a, and the dust collected in the dust box 11 can be prevented as much as possible from scattering to the outside of the dust box 11 through the air holes 17a.

(E)

In the air conditioning apparatus 1 of the present embodiment, since the dust box 11 is disposed on the outside of the casing main body 3 in a plan view of the casing main body 3, the dust box 11 does not interfere with the intake port 41 or the discharge ports 42a through 42d of the face panel 4. The dust box 11 can also be increased in size, and the operation of using the vacuum cleaner to discharge the dust collected in the dust box 11 can be performed less frequently.

(F)

In the air conditioning apparatus 1 of the present embodiment, since the dust box 11 is disposed at a corner of the face panel 4 (in this case, the corner corresponding to the side panel 32a of the casing main body 3), the space in the corner of the face panel 4 can be utilized effectively.

(6) Modification 1

Figure 9:
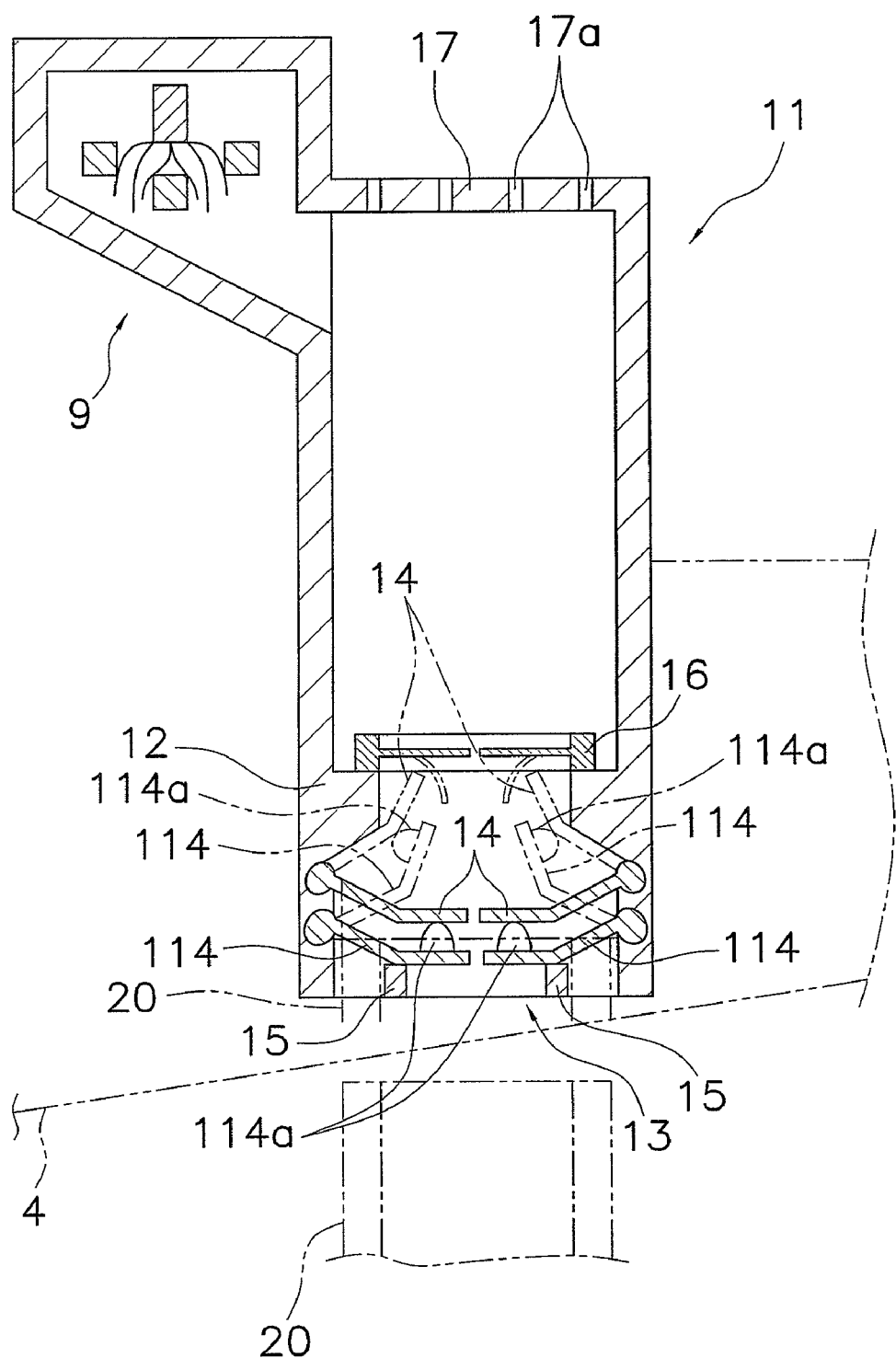
FIG. 9 is a schematic cross-sectional side view of a cleaning mechanism and a dust box of an air conditioning apparatus according to Modification 1.

In the air conditioning apparatus 1 according to the embodiment described above, one opening/closing lid 14 was provided to the nozzle insertion hole 13 in the dust box 11, but two lids may also be provided in alignment with the direction in which the nozzle 20 of the vacuum cleaner is inserted, as shown in FIG. 9. Protuberances 114a that come into contact with the bottom surface of the opening/closing lid 14 are formed on an opening/closing lid 114 disposed below the opening/closing lid 14, and when the nozzle 20 of the vacuum cleaner is inserted from below to push up and open the opening/closing lid 114, the bottom surface of the opening/closing lid 14 can be simultaneously pushed and opened by the protuberances 114a.

In the air conditioning apparatus 1 according to the present modification, since two opening/closing lids 14, 114 are provided in alignment with the direction in which the nozzle 20 of the vacuum cleaner is inserted, it is possible to further improve the effects in which the dust collected in the dust box 11 by the cleaning mechanism 9 is prevented from dropping out through the nozzle insertion hole 13.

(7) Modification 2

Figure 10:
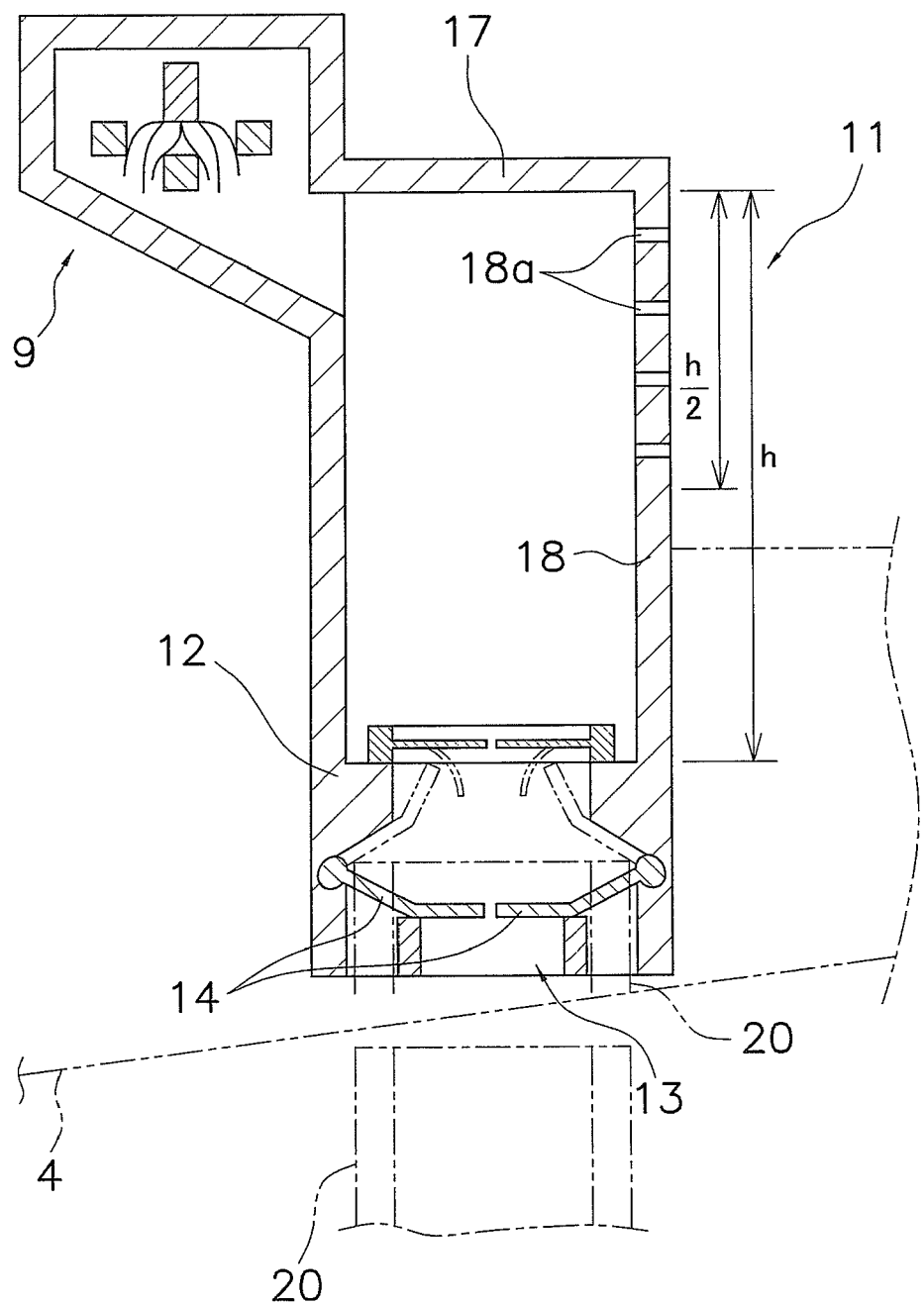
FIG. 10 is a schematic cross-sectional side view of a cleaning mechanism and a dust box of an air conditioning apparatus according to Modification 2.
Figure 11:
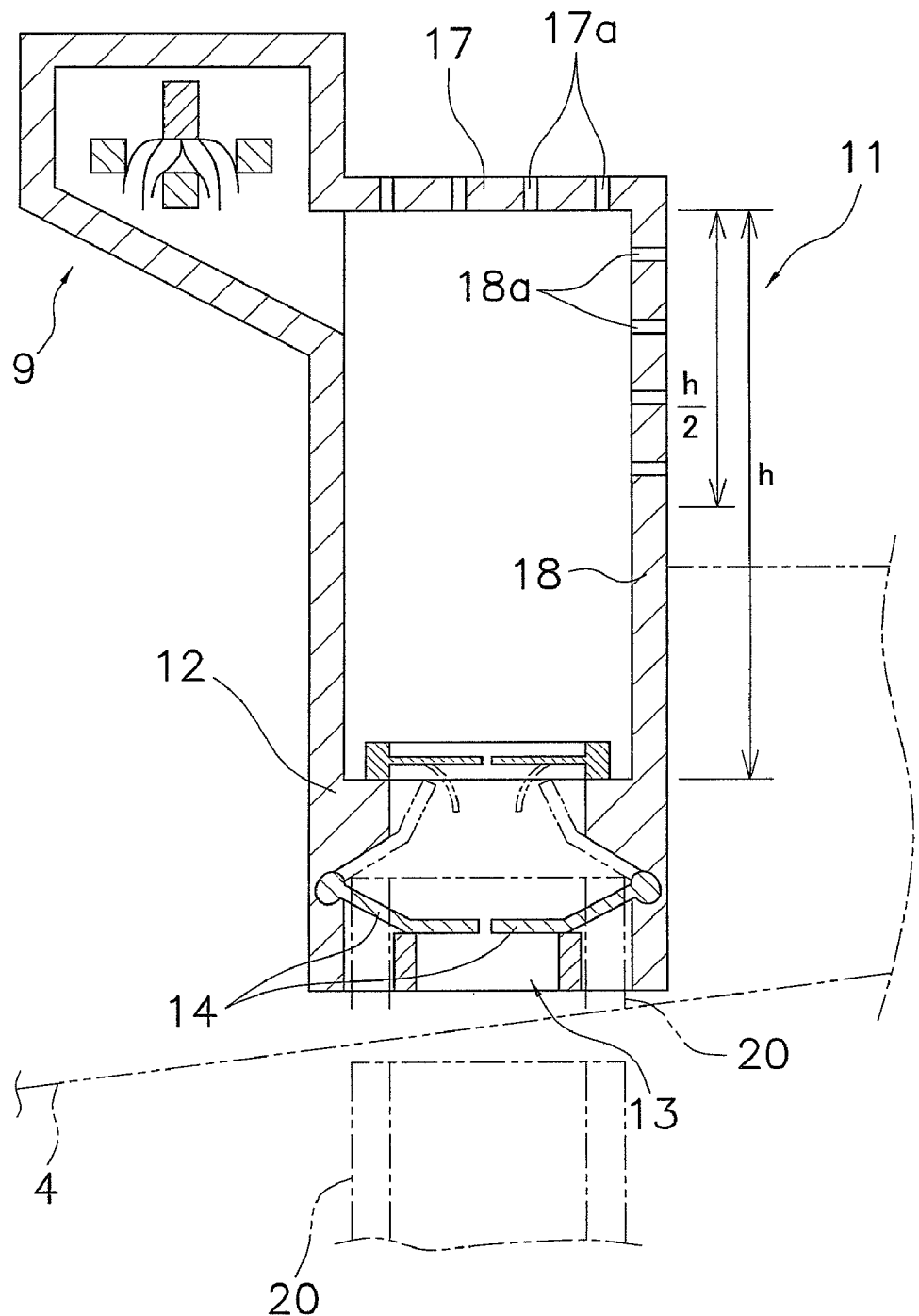
FIG. 11 is a schematic cross-sectional side view of a cleaning mechanism and a dust box of an air conditioning apparatus according to Modification 2.

In the air conditioning apparatus 1 according to the embodiment and Modification 1 described above, a plurality of air holes 17a communicating with the outside of the casing 2 was formed in the second wall 17 constituting the top surface of the dust box 11, but a plurality of air holes 18a communicating with the outside of the casing 2 may also be formed in the third wall 18 constituting the side surface of the dust box 11, either instead of forming the plurality of air holes 17a in the second wall 17, or in addition to forming the plurality of air holes 17a in the second wall 17, as shown in FIG. 10 or FIG. 11. The plurality of air holes 18a is formed from the middle between the first wall 12 and the second wall 17 up to a position on the side of the second wall 17 (specifically, downward from the internal surface of the second wall 17 up to half of the distance h between the internal surface of the first wall 12 and the internal surface of the second wall 17). These air holes 18a are substantially circular and have a diameter of 5 mm or less, similar to the embodiment and Modification 1 described above.

In the air conditioning apparatus 1 according to the present modification, a plurality of air holes 18a is formed in the third wall 18 in contact with the first wall 12 that faces the nozzle insertion hole 13, and when the nozzle 20 of the vacuum cleaner is inserted into the nozzle insertion hole 13 and the dust is drawn into the vacuum cleaner and discharged out of the dust box 11, air from outside the dust box 11 can get in through the air holes 18a. Therefore, it is possible to prevent making it difficult for the dust to be drawn into the vacuum cleaner by extreme decreases in the pressure in the dust box 11. Moreover, since the air holes 18a are formed from a middle position between the first wall 12 and the second wall 17 up to a position in the side of the second wall 17, when the nozzle 20 of the vacuum cleaner is inserted into the nozzle insertion hole 13 and dust is drawn into the vacuum cleaner and discharged out of the dust box 11, it is not likely that air coming in from the outside of the dust box 11 will be impeded by the dust collected in the dust box 11.

In FIGS. 10 and 11, only one opening/closing lid 14 is provided in the nozzle insertion hole 13, but two opening/closing lids 14, 114, may also be provided as in Modification 1.

(8) Modification 3

Figure 12:
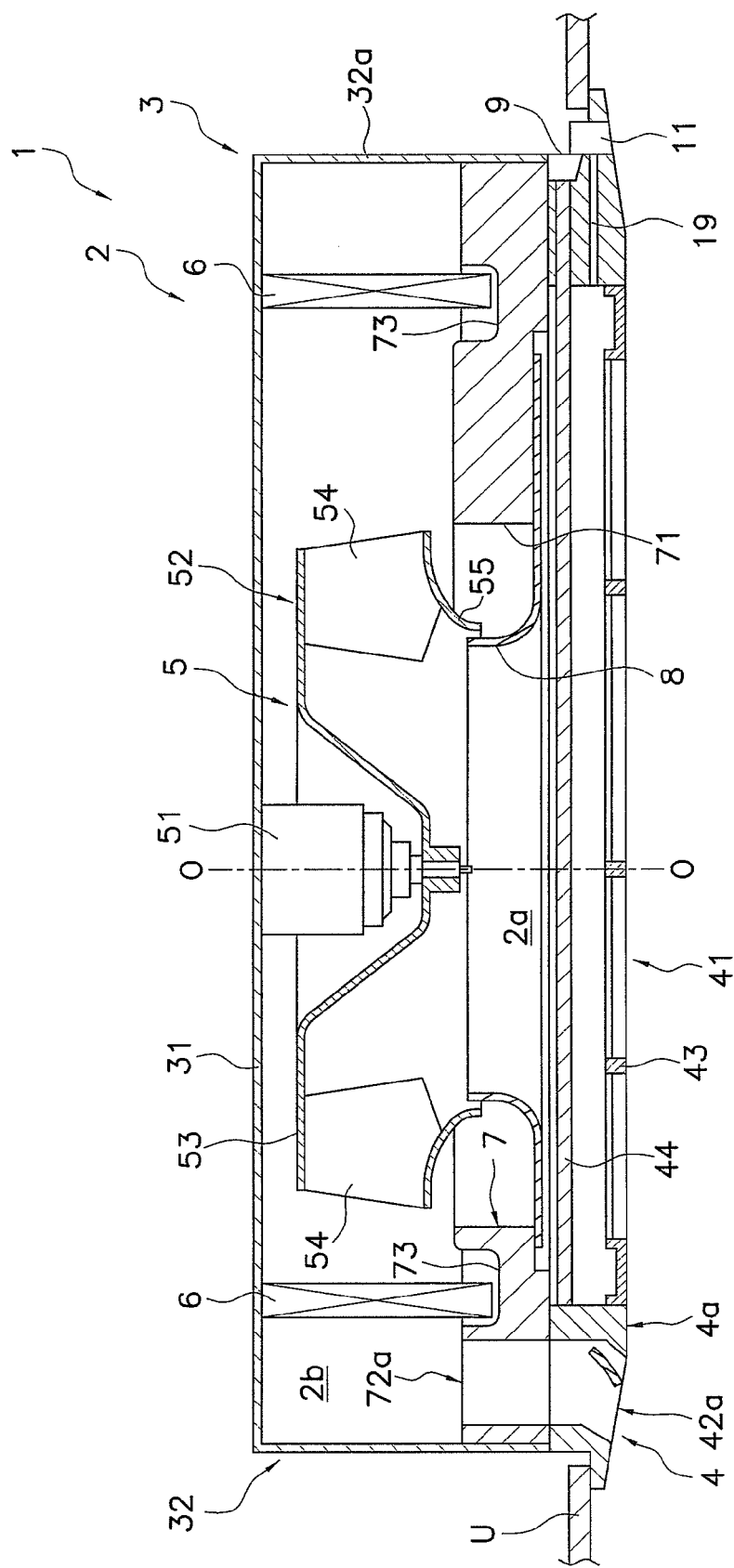
FIG. 12 is a schematic cross-sectional side view of an air conditioning apparatus according to Modification 3, and is a drawing corresponding to FIG. 4.
Figure 13:
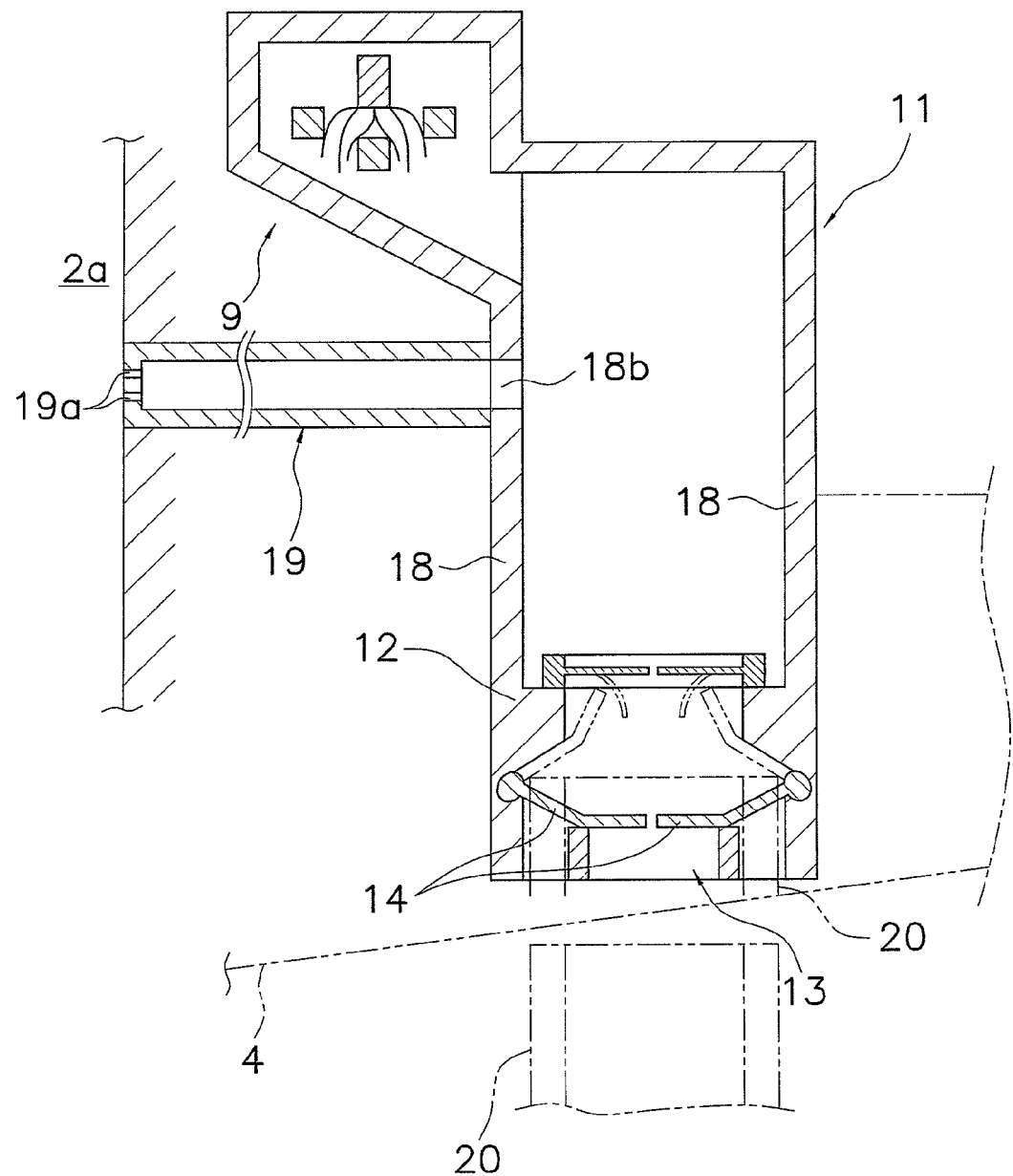
FIG. 13 is a schematic cross-sectional side view of a cleaning mechanism, a dust box, and a communicating part of the air conditioning apparatus according to Modification 3.

In the air conditioning apparatus 1 according to the embodiment and Modifications 1 and 2 described above, since air holes 17a, 18a are formed in the dust box 11 and the dust box 11 communicates with the outside of the casing 2, when the nozzle 20 of the vacuum cleaner is inserted into the nozzle insertion hole 13 and the dust is drawn into the vacuum cleaner and discharged out of the dust box 11, it is possible to prevent making it difficult for the dust to be drawn into the vacuum cleaner by extreme decreases in the pressure in the dust box 11. However, another option is to provide the casing 2 (specifically, the face panel 4) with a communicating part 19 in which a plurality of air holes 19a are formed at a position facing the intake flow channel 2a, and to connect the communicating part 19 at the position of an opening 18b formed in the third wall 18 of the dust box 11, thereby causing the dust box 11 to communicate with the intake flow channel 2a, as shown in FIGS. 12 and 13. The communicating part 19 herein is a cylindrical member in which the end nearer the external periphery is connected to the third wall 18 of the dust box 11, and the other end nearer the internal periphery extends from the corner of the face panel 4 towards the internal periphery. The plurality of air holes 19a formed at the other end of the communicating part 19 communicates with the portion of the intake flow channel 2a that lies between the filter 44 and the intake grill 43. These air holes 19a are substantially circular and have a diameter of 5 mm or less, similar to the embodiment and Modifications 1 and 2 described above.

In the air conditioning apparatus 1 according to the present modification, a communicating part 19 having a plurality of air holes 19a formed at a position facing the intake flow channel 2a is provided so as to caused the intake flow channel 2a to communicate with the dust box 11, allowing air from outside of the dust box 11 to get in through the air holes 19a when the nozzle 20 of the vacuum cleaner is inserted into the nozzle insertion hole 13 and dust is drawn into the vacuum cleaner and discharged out of the dust box 11. Therefore, it is possible to prevent making it difficult for the dust to be drawn into the vacuum cleaner by extreme decreases in the pressure in the dust box 11.

Moreover, since these air holes 19a communicate with the intake flow channel 2a, negative pressure can be created in the dust box 11 by the operation of the ventilation fan 5, whereby the dust in the dust box 11 can be compressed and collected inside the dust box 11 in a compact manner. To achieve the effect of compressing the dust inside the dust box 11 more efficiently, it is preferable to omit the air holes 17a, 18a that are formed in the second wall 17 and third wall 18 and that communicate with the outside of the casing 2 in the embodiment and in Modifications 1 and 2 described above.

Since the air holes 19a communicate with a position in the intake flow channel 2a upstream of the filter 44, even if dust collected in the dust box 11 scatters outside of the dust box 11 through the air holes 19a, the dust is again collected by the filter 44 and does not get drawn into the casing 2.

In FIG. 13, only one opening/closing lid 14 is provided in the nozzle insertion hole 13, but two opening/closing lids 14, 114 may also be provided, similar to Modification 1.

(9) Modification 4

Figure 14:
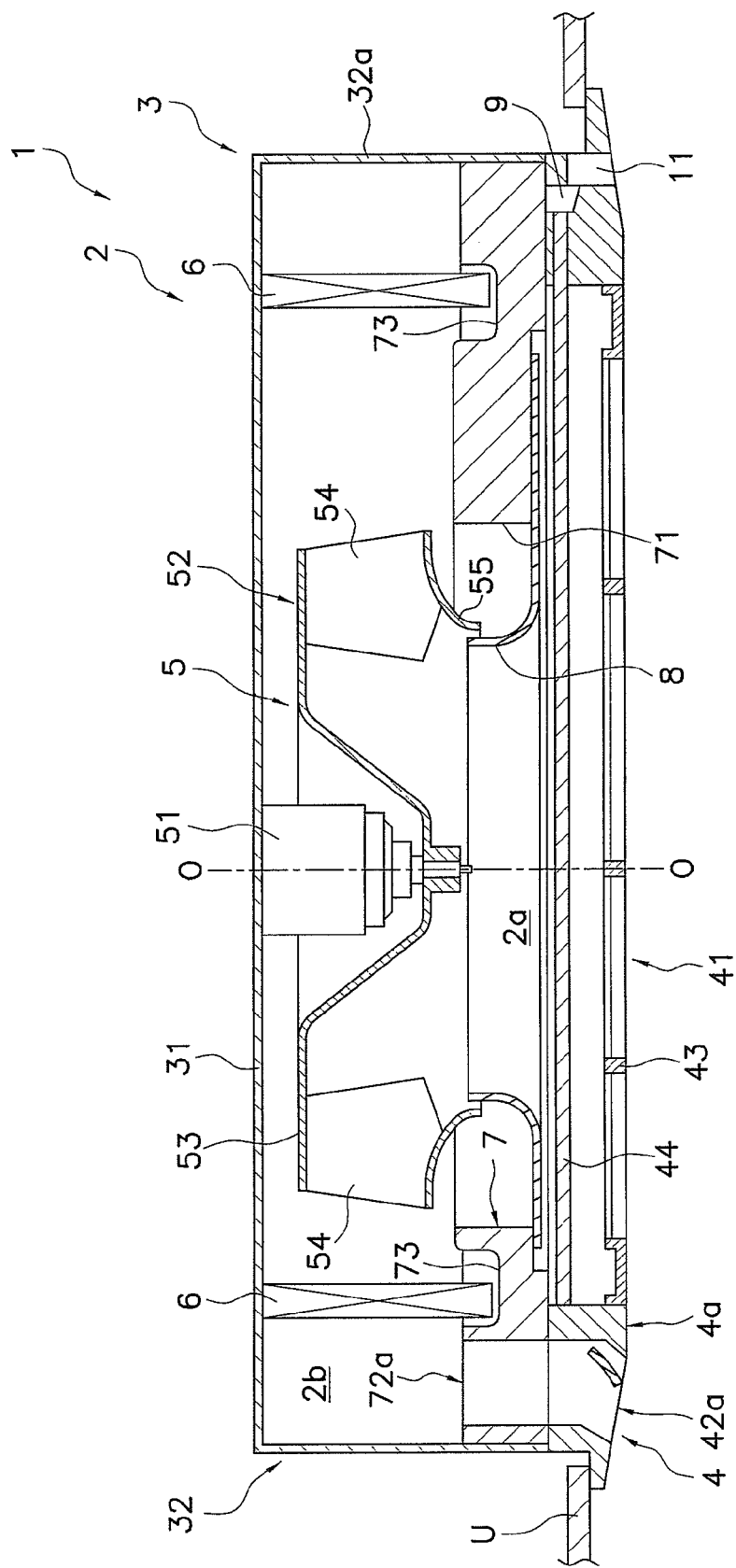
FIG. 14 is a schematic cross-sectional side view of an air conditioning apparatus according to Modification 4, and is a drawing corresponding to FIG. 4.
Figure 15:
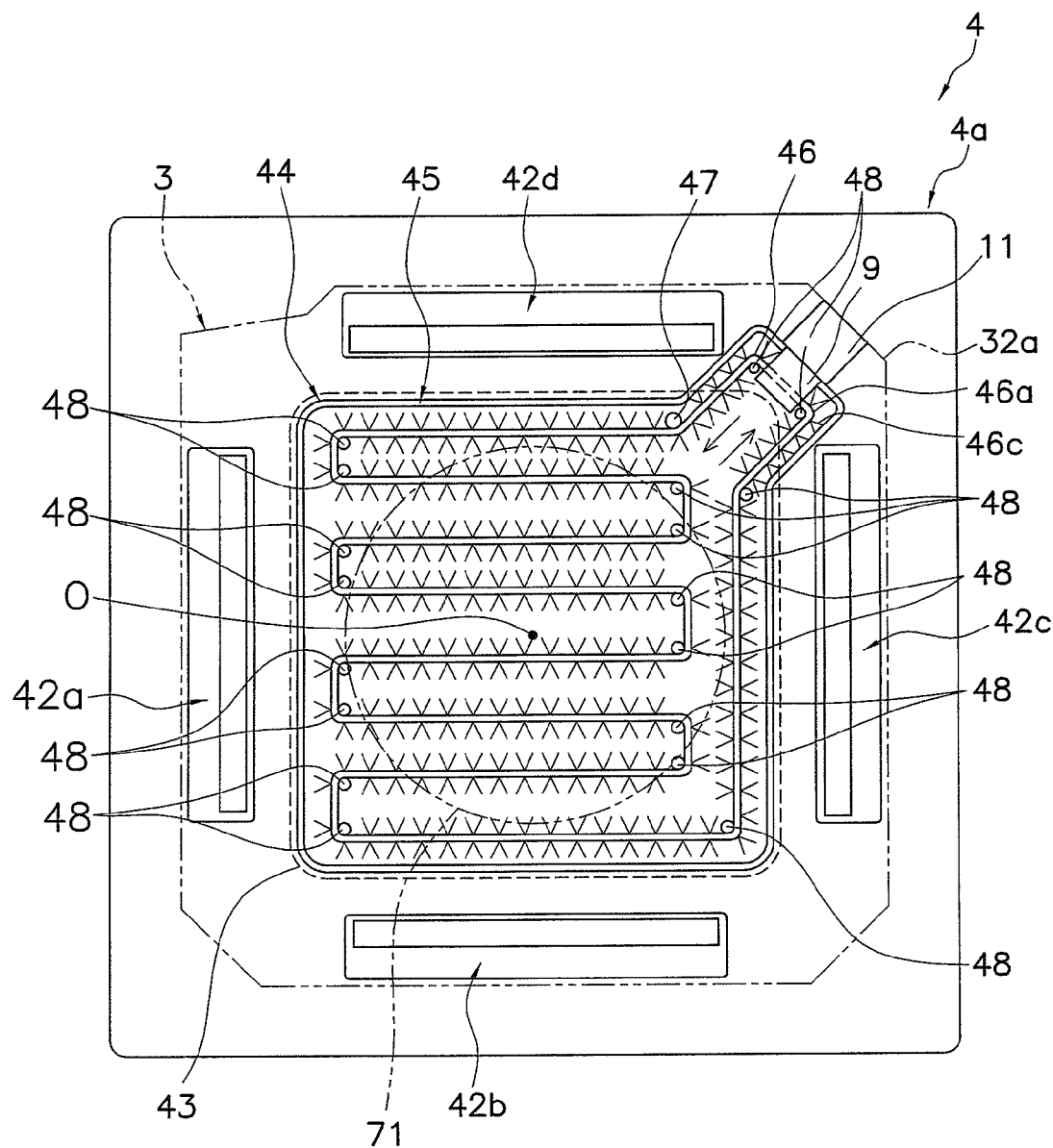
FIG. 15 is a schematic cross-sectional plan view of a face panel according to Modification 4.

In the air conditioning apparatus 1 according to the embodiment and to Modifications 1 through 3 described above, the dust box 11 was disposed at a corner of the face panel 4 and on the outside of the casing main body 3 as seen in a plan view of the casing main body 3, but another option is to provide the dust box 11 between the discharge ports of the face panel 4 (specifically, between the discharge port 42c and discharge port 42d), as shown in FIGS. 14 and 15. The outermost periphery of the dust box 11 herein runs along the side panel 32a of the casing main body 3 in a plan view of the casing main body 3; i.e., the cleaning mechanism 9 and the dust box 11 are disposed on the inside of the casing main body 3.

In the air conditioning apparatus 1 according to the present modification, the discharge ports 42a through 42d that blow the air drawn by the ventilation fan 5 into the casing main body 3 out into the air-conditioned room are formed in the face panel 4 so as to encircle the intake port 41, and the dust box 11 is disposed at a position between the discharge ports. Therefore, the dust box 11 does not interfere with the intake port 41 or the discharge ports 42a through 42d of the face panel 4. Moreover, in the air conditioning apparatus 1 according to the present modification, since the dust box 11 is disposed on the inside of the casing main body 3 in a plan view of the casing main body 3, the dust box 11 can be disposed in proximity to the filter 44.

In the air conditioning apparatus 1 according to the present modification, when the nozzle 20 of the vacuum cleaner is inserted into the nozzle insertion hole 13 and dust is drawn into the vacuum cleaner and discharged out of the dust box 11, either a plurality of air holes 18a can be formed in the third wall 18 as in Modification 2 (see FIG. 10), or a communicating part 19 having a plurality of air holes 19a formed at a position facing the intake flow channel 2a can be connected to the third wall 18 as in Modification 3 (see FIGS. 12 and 13), in order to allow air to get in from the outside of the dust box 11.

(10) Modification 5

In the air conditioning apparatus 1 according to Modification 4 described above, the dust box 11 is disposed on the inside of the casing main body 3 and in between the discharge ports (specifically, the discharge port 42c and the discharge port 42d) of the face panel 4, but the dust box 11 may furthermore be disposed on the inside of the casing main body 3. In this case, even if the dust box 11 is disposed in the intake flow channel 2a, the flow of air drawn in by the ventilation fan 5 may be not substantially hindered.

Figure 16:
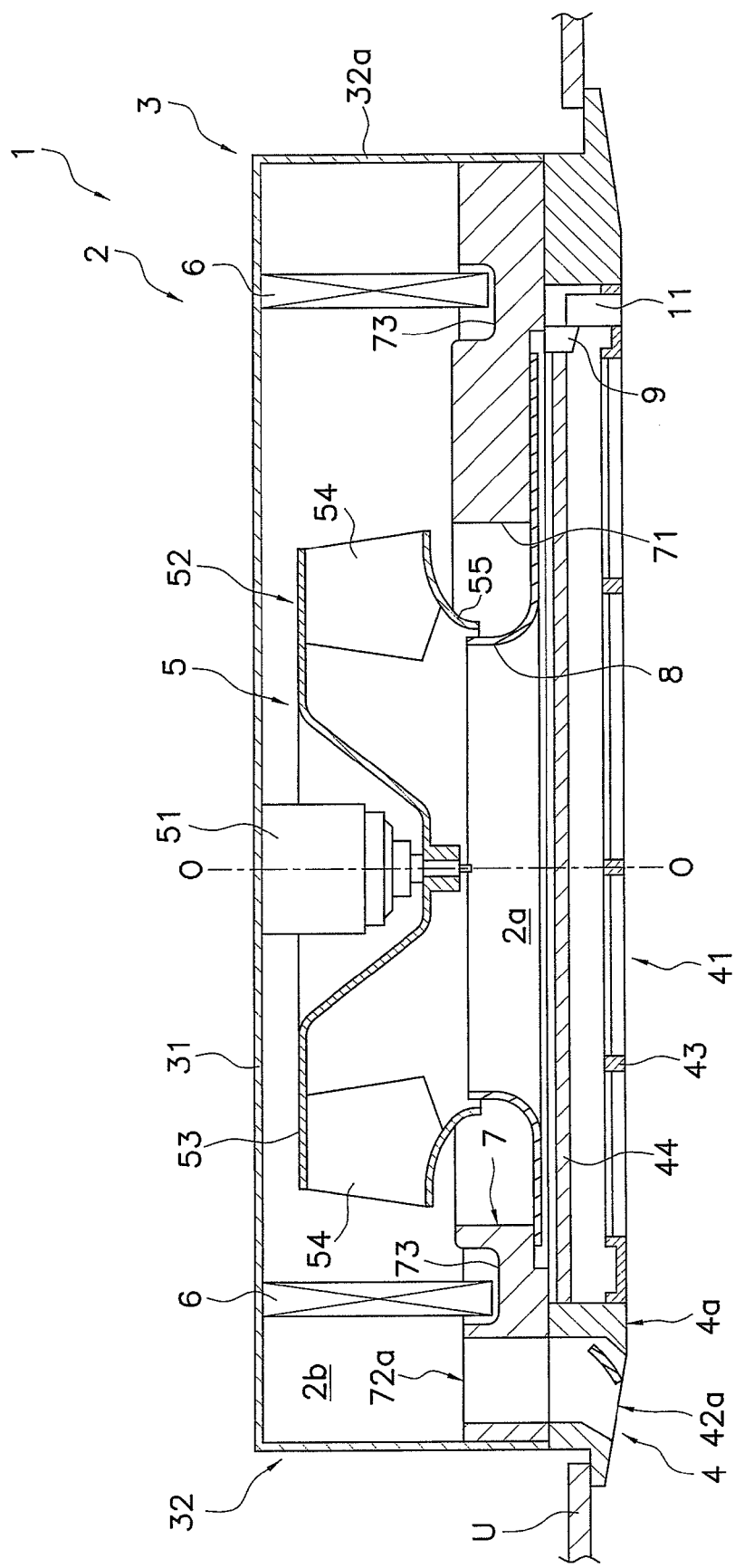
FIG. 16 is a schematic cross-sectional side view of an air conditioning apparatus according to Modification 5, and is a drawing corresponding to FIG. 4.
Figure 17:
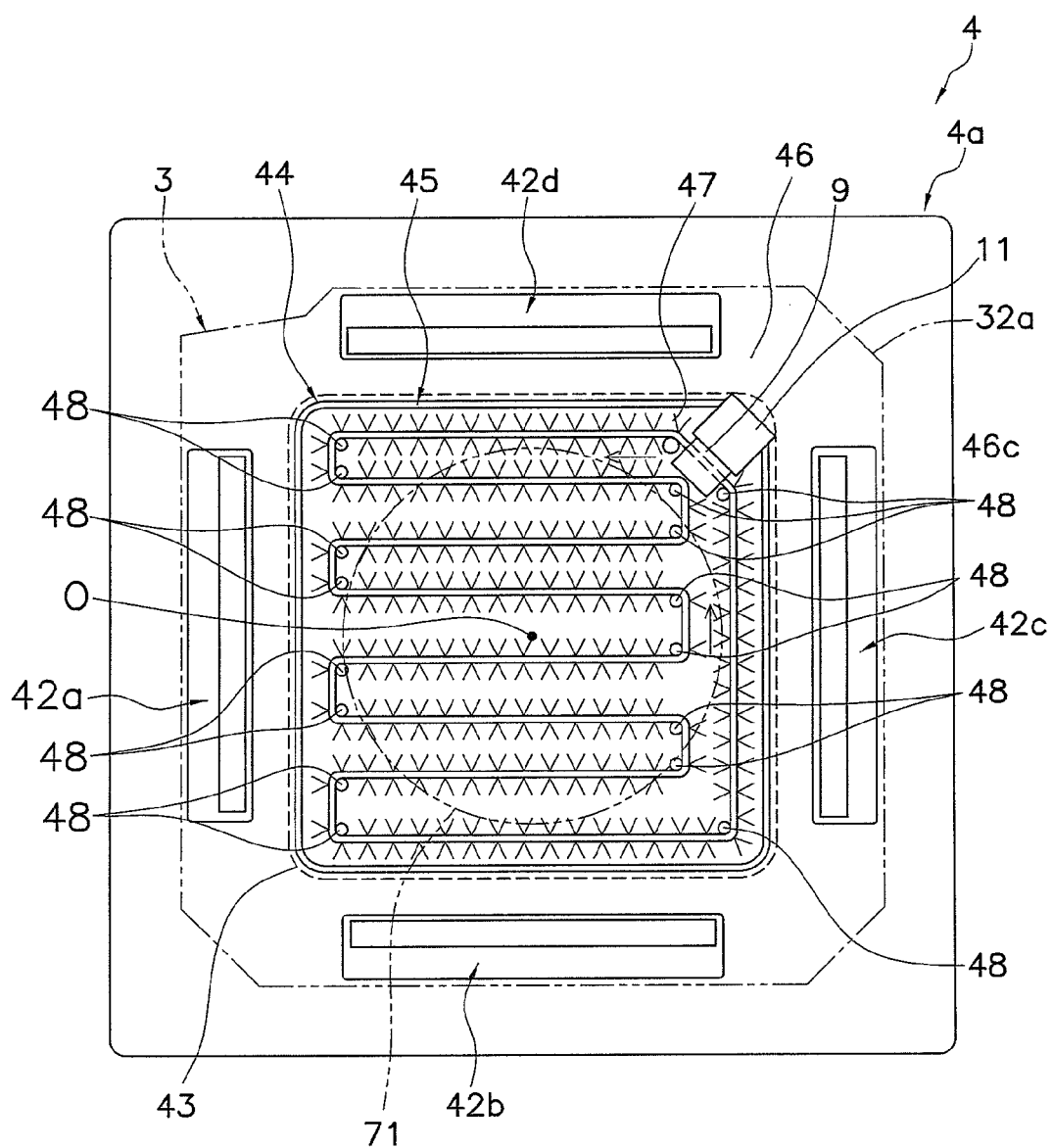
FIG. 17 is a schematic cross-sectional plan view of a face panel according to Modification 5.

For example, the dust box 11 may be disposed at a corner of the intake grill 43 as seen in a plan view of the casing main body 3, as shown in FIGS. 16 and 17. In this case, the dust box 11 is disposed in the intake flow channel 2a, but since the cleaning mechanism 9 and the dust box 11 are disposed farther towards the outside than the intake hole 71 of the drain pan 7 or the center hole of the bell mouth 8, the flow of air drawn in by the ventilation fan 5 is not impeded, and the intake port 41 and dust box 11 do not substantially interfere with each other.

Figure 18:
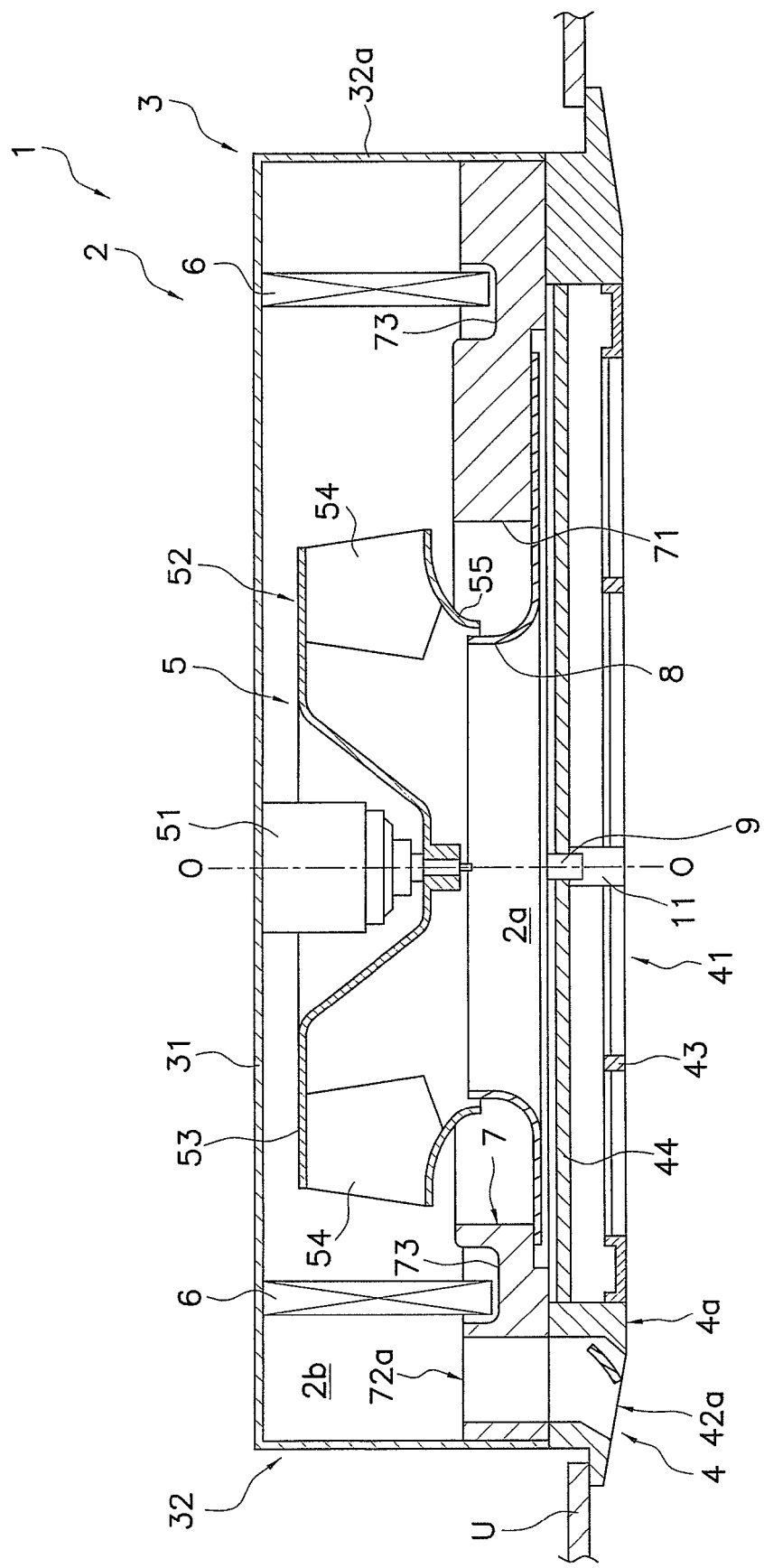
FIG. 18 is a schematic cross-sectional side view of an air conditioning apparatus according to Modification 5, and is a drawing corresponding to FIG. 4.
Figure 19:
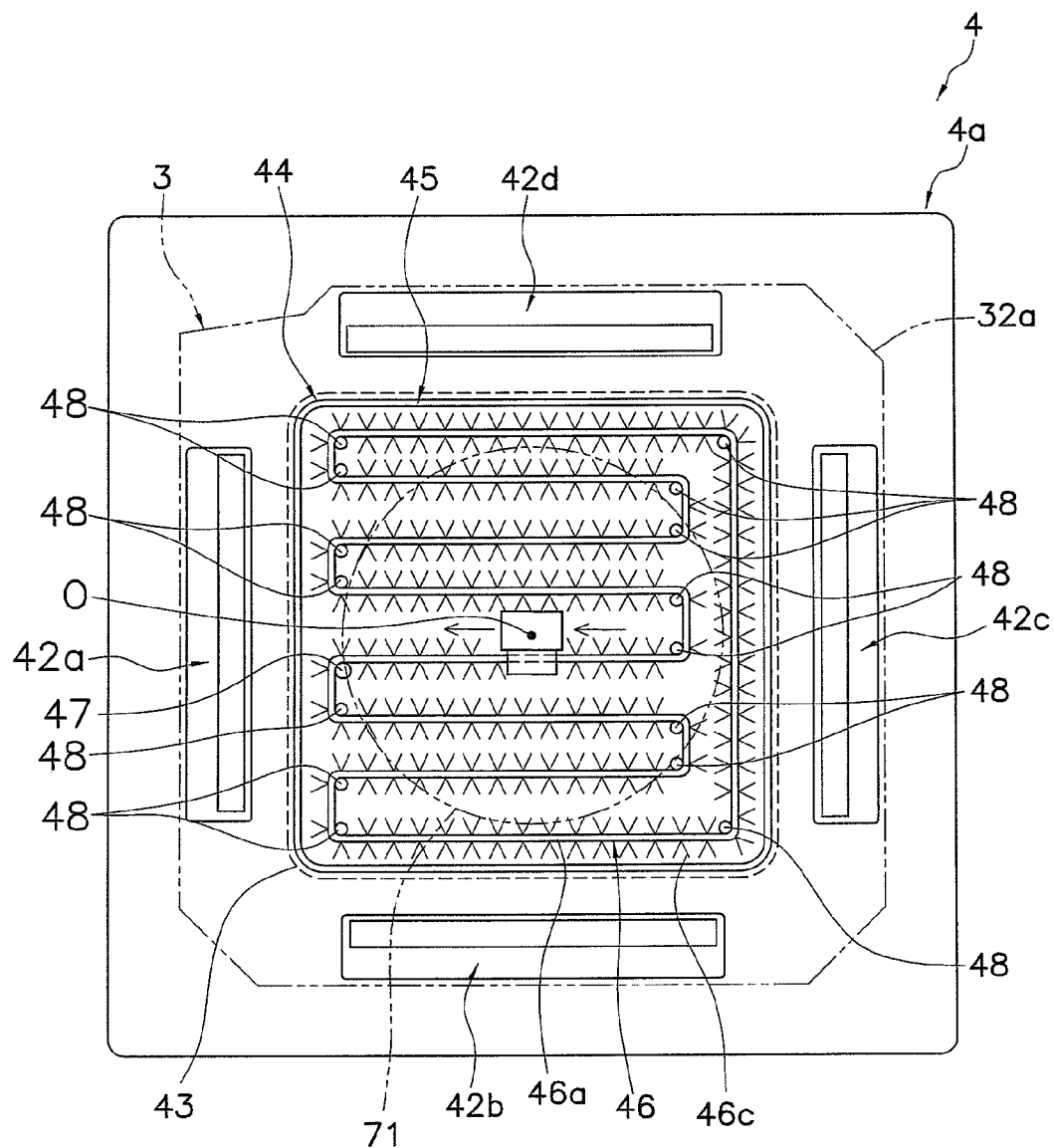
FIG. 19 is a schematic cross-sectional plan view of a face panel according to Modification 5.

Another option is to dispose the dust box 11 at a position that faces the substantial center of the ventilation fan 5 as seen in a plan view of the casing main body 3, as shown in FIGS. 18 and 19. In this case, the dust box 11 is disposed in the intake flow channel 2a and the cleaning mechanism 9 and dust box 11 are disposed so as to overlap the intake hole 71 of the drain pan 7 and the center hole of the bell mouth 8 as seen in a plan view of the casing main body 3. However, the cleaning mechanism 9 and the dust box 11 do not impede the flow of intake air from their position facing the external periphery of the ventilation fan 5, where the air flow rate is greater than the air flow rate of the ventilation fan 5 in the substantial center of the intake flow channel 2a. Therefore, the intake port 41 and the dust box 11 do not substantially interfere with each other.

Moreover, in the air conditioning apparatus 1 according to the present modification, the dust box 11 communicates with the intake flow channel 2a merely by forming a plurality of air holes 17a in the second wall 17 and a plurality of air holes 18a in the third wall 18 of the dust box 11, as in the embodiment and Modifications 1 and 2 described above (see FIGS. 8 through 11). Specifically, the dust box 11 and the intake flow channel 2a can be caused to communicate without providing a communicating part 19, as in the air conditioning apparatus 1 according to Modification 3. It is thereby possible with the air conditioning apparatus 1 according to the present modification to achieve the effect of compressing the dust in the dust box 11 and collecting the dust in the dust box 11 in a compact manner without providing the communicating part 19, similar to the air conditioning apparatus 1 according to Modification 3.

(11) Other Embodiments

Embodiments of the present invention were described above with reference to the drawings, but the specific configuration is not limited to these embodiments, and modifications can be made within a range that does not deviate from the scope of the invention.

For example, in the embodiments and modifications described above, a configuration was used in which the filtration member 46 constituting the filter 44 operated automatically, and the dust collected by the filtration member 46 was removed and collected in the dust box 11 with the use of the cleaning mechanism 9 disposed in proximity to the dust box 11. However, another option is to use a configuration in which the cleaning mechanism 9 operates automatically and removes dust from the filter 44, and the removed dust is conveyed to the dust box 11 and collected in the dust box 11.

INDUSTRIAL APPLICABILITY

If the present invention is utilized, it is possible to reduce the labor needed to clean a filter provided in an intake port on the bottom surface of a casing in a ceiling-mounted air conditioning apparatus.

What is claimed is:

1. An air conditioning apparatus configured to be mountable on a ceiling of an air-conditioned room, the air conditioning apparatus comprising:
    a casing having an intake port formed in a bottom surface thereof;
    a filter provided in the intake port;
    a cleaning mechanism arranged to remove dust collected by the filter from the filter; and
    a dust box provided at the bottom surface of the casing to collect the dust removed by the cleaning mechanism, the dust box having a nozzle insertion hole formed facing downward in the dust box, and the nozzle insertion hole being sized and configured to receive a nozzle of a vacuum cleaner therein,
    the nozzle insertion hole being provided with an opening/closing lid that is configured to be opened by the insertion of the nozzle of the vacuum cleaner, and
    the nozzle insertion hole being provided with an additional opening/closing lid, and the two opening/closing lids being arranged in alignment with a direction in which the nozzle of the vacuum cleaner is moved when inserted in the nozzle insertion hole.

2. An air conditioning apparatus configured to be mountable on a ceiling of an air-conditioned room, the air conditioning apparatus comprising:
    a casing having an intake port formed in a bottom surface thereof;
    a filter provided in the intake port;
    a cleaning mechanism arranged to remove dust collected by the filter from the filter; and
    a dust box provided at the bottom surface of the casing to collect the dust removed by the cleaning mechanism, the dust box having a nozzle insertion hole formed facing downward in the dust box, and the nozzle insertion hole being sized and configured to receive a nozzle of a vacuum cleaner therein,
    the dust box being provided with a valve composed of a material that is elastically deformable by suction force of the vacuum cleaner.

3. An air conditioning apparatus configured to be mountable on a ceiling of an air-conditioned room, the air conditioning apparatus comprising:
    a casing having an intake port formed in a bottom surface thereof;
    a filter provided in the intake port;
    a cleaning mechanism arranged to remove dust collected by the filter from the filter; and
    a dust box provided at the bottom surface of the casing to collect the dust removed by the cleaning mechanism, the dust box having a nozzle insertion hole formed facing downward in the dust box, and the nozzle insertion hole being sized and configured to receive a nozzle of a vacuum cleaner therein,
    the dust box having a first wall that faces the nozzle insertion hole, a second wall that faces the first wall, and a third wall that is in contact with the first wall, and a plurality of air holes formed in the second wall.

4. An air conditioning apparatus configured to be mountable on a ceiling of an air-conditioned room, the air conditioning apparatus comprising:
    a casing having an intake port formed in a bottom surface thereof;
    a filter provided in the intake port;
    a cleaning mechanism arranged to remove dust collected by the filter from the filter; and
    a dust box provided at the bottom surface of the casing to collect the dust removed by the cleaning mechanism, the dust box having a nozzle insertion hole formed facing downward in the dust box, and the nozzle insertion hole being sized and configured to receive a nozzle of a vacuum cleaner therein,
    the dust box having a first wall that faces the nozzle insertion hole, a second wall that faces the first wall, a third wall that is in contact with the first wall, and a plurality of air holes formed in the third wall.

5. The air conditioning apparatus as recited in claim 4, wherein
    the air holes are formed from a middle position between the first wall and the second wall up to a position on a side of the second wall.

6. The air conditioning apparatus as recited in claim 3, wherein
    the casing has a ventilation fan disposed therein that is arranged to draw air into the casing through the intake port;
    the casing has an intake flow channel formed therein that is arranged to transport air from the intake port to the ventilation fan; and
    the air holes communicate with the intake flow channel.

7. An air conditioning apparatus configured to be mountable on a ceiling of an air-conditioned room, the air conditioning apparatus comprising:
    a casing having an intake port formed in a bottom surface thereof, a ventilation fan disposed therein that is arranged to draw air into the casing through the intake port, and an intake flow channel formed therein that is arranged to transport air from the intake port to the ventilation fan;
    a filter provided in the intake port;
    a cleaning mechanism arranged to remove dust collected by the filter from the filter; and
    a dust box provided at the bottom surface of the casing to collect the dust removed by the cleaning mechanism, the dust box having a nozzle insertion hole formed facing downward in the dust box, and the nozzle insertion hole being sized and configured to receive a nozzle of a vacuum cleaner therein,
    the casing being provided with a communicating part connected to the dust box and having a plurality of air holes formed at a position facing the intake flow channel.

8. The air conditioning apparatus as recited in claim 7, wherein
    the filter has an intake grill provided on an underside thereof; and
    the air holes communicate with a portion of the intake flow channel that lies between the filter and the intake grill.

9. The air conditioning apparatus as recited in claim 8, wherein the air holes are substantially circular with each having a diameter of 5 mm or less.

10. An air conditioning apparatus configured to be mountable on a ceiling of an air-conditioned room, the air conditioning apparatus comprising:

a casing having an intake port formed in a bottom surface thereof;

a filter provided in the intake port;

a cleaning mechanism arranged to remove dust collected by the filter from the filter; and a dust box provided at the bottom surface of the casing to collect the dust removed by the cleaning mechanism, the dust box having a nozzle insertion hole formed facing downward in the dust box, and the nozzle insertion hole being sized and configured to receive a nozzle of a vacuum cleaner therein, the nozzle insertion hole being provided with an opening/closing lid that is configured to be opened by the insertion of the nozzle of the vacuum cleaner, the opening/closing lid being configured to be closed by withdrawal of the nozzle of the vacuum cleaner from the nozzle insertion hole, and the opening/closing lid opening upward.

11. The air conditioning apparatus as recited in claim 10, wherein the opening/closing lid is configured to be closed due to gravity.

12. The air conditioning apparatus as recited in claim 11, wherein the nozzle insertion hole is provided with an additional opening/closing lid, and the two opening/closing lids are arranged in alignment with a direction in which the nozzle of the vacuum cleaner is moved when inserted in the nozzle insertion hole.

13. The air conditioning apparatus as recited in claim 12, wherein the dust box is provided with a valve composed of a material that is elastically deformable by suction force of the vacuum cleaner.

14. The air conditioning apparatus as recited in claim 13, wherein the casing has a ventilation fan disposed therein that is arranged to draw air into the casing through the intake port;

the casing has an intake flow channel formed therein that is arranged to transport air from the intake port to the ventilation fan; and the casing is provided with a communicating part that is connected to the dust box and that has a plurality of air holes formed at a position facing the intake flow channel.

15. The air conditioning apparatus as recited in claim 14, wherein the filter has an intake grill provided on an underside thereof; and the air holes communicate with a portion of the intake flow channel that lies between the filter and the intake grill.

* * * * *